(12) United States Patent
Neifeld et al.

(10) Patent No.: US 7,676,375 B1
(45) Date of Patent: Mar. 9, 2010

(54) SYSTEM AND METHOD FOR VALUING PATENTS

(75) Inventors: Richard Alan Neifeld, Arlington, VA (US); Martin Goffman, Edison, NJ (US)

(73) Assignee: StockPricePredictor.com, LLC, Fairfax, VA (US)

( * ) Notice: Subject to any disclaimer, the term of this patent is extended or adjusted under 35 U.S.C. 154(b) by 0 days.

(21) Appl. No.: 09/979,976

(22) PCT Filed: May 4, 2000

(86) PCT No.: PCT/US00/06691

§ 371 (c)(1),
(2), (4) Date: Nov. 29, 2001

(87) PCT Pub. No.: WO00/75857

PCT Pub. Date: Dec. 14, 2000

Related U.S. Application Data

(60) Provisional application No. 60/142,961, filed on Jul. 12, 1999, provisional application No. 60/137,495, filed on Jun. 4, 1999.

(51) Int. Cl.
 *G06Q 30/00* (2006.01)
(52) U.S. Cl. .......................... 705/1; 705/36 R
(58) Field of Classification Search .............. 705/1, 705/10–44, 36 R
See application file for complete search history.

(56) References Cited

U.S. PATENT DOCUMENTS

| | | | | |
|---|---|---|---|---|
| 4,334,270 A | | 6/1982 | Towers ........................ | 364/300 |
| 5,991,751 A | * | 11/1999 | Rivette et al. ................. | 707/1 |
| 5,999,907 A | * | 12/1999 | Donner ........................ | 705/1 |
| 6,175,824 B1 | | 1/2001 | Breitzman .................... | 705/36 |
| 6,556,992 B1 | * | 4/2003 | Barney et al. ................. | 707/6 |

OTHER PUBLICATIONS

Bednarek, Michael D., "Global Patent Strategy", Managing Intellectual Property, v9n44 (Nov. 1994): 12-16.*
Samuelson, Paul A. and Nordhaus, William D., "Economics", 13th ed. (McGraw-Hill, New York, 1989): 110 and 976.*
Mogee et al., "International Patent Analysis as a Tool for Corporate Technology Analysis and Planning," Technology Analysis & Strategic Management, vol. 6, No. 4, 1994.
Mogee et al., "Extracting Useful Information for Technology Management from International Patent Records," Sep. 30, 1992.

(Continued)

*Primary Examiner*—Donald L Champagne
(74) *Attorney, Agent, or Firm*—Neifeld IP Law, PC

(57) ABSTRACT

A computer system implementing a macro economic model based upon macroeconomic data and relative value characteristics data of patents that determines nominal values for (1) goods and services and (2) profits generated by sales that are covered by the rights of a patent, implements an income value theory to value the patent based upon the predicted values of profits or goods and services covered by the patent, determines patent terms from patent filing, publication, and issue dates, determines patent assignees from patent data, and uses the value of a company's patents, the patent issuance data and term date data, to determine trends versus time in: the number of a company's enforceable patents; the number of a company's patents obtained; the nominal value of net earnings and of goods and services sold that are covered by the company's patents; the nominal value of the sum of the company's patents, and provides comparisons of those trends between companies, regions, and economic sectors, providing the results of the analysis to users of the computer system. The computer system employs a user database enabling a novel electronic accounting model enabling payment by affiliates, programmed securities trading, and accrediting of investors.

15 Claims, 6 Drawing Sheets

OTHER PUBLICATIONS

Mogee, Mary Ellen, "Inward International Licensing by US-Based Firms: Trends and Implications," Technology Transfer Spring 1991.
Mogee, Mary Ellen, "Patent Analysis Methods in Support of Licensing," Technology Transfer Society 1997 Annual Conference, Jul. 22, 1997, Denver Colorado.
"Benchmarking US Competitive Technological Position in Implantable Prostheses With Data on New Products, Patent Families, and Patent Citations."
Mogee, Mary Ellen, "Patent Citation Analysis: A Selective Bibliography."
Mogee, Mary Ellen, "Foreign Patenting Behavior of Small and Large Firms," Jul. 16, 1997.
Mogee, Mary Ellen, "International Patent Data for Technology Analysis and Planning," Oct. 1990.
Mogee, Mary Ellen, "Using Patent Data Identify and Assess Technology Transfer Opportunities at Government Laboratories," prepared for presentation at the 18th Annual Meeting of the Technology Transfer Society held in Ann Arbor, MI, Jun. 26-29, 1993.
Mogee, Mary Ellen, "Indicators of the Diffusion of Innovations for Science Indicators: Implications Drawn from the Diffusion Literature," prepared for the National Science Foundation Under Purchase Order No. 86-GA-0136, Mar. 1987.
Mogee et al., "International Comparisons of Technological Performance Using the Derwent World Patents Index: Methodological Issues."
"International Patenting Trends for Three Important Technologies," Science & Engineering Indicators, 1998.
Mogee et al., "Patent Indicators of Global Technology Strategy," based upon work supported by the National Science Foundation under award number Grant DMI-9302340, Jan. 1997.
Mogee et al., "Citation Analysis of Major Pharmaceutical Firms," Patent World, May 1997.
Mogee, Mary Ellen, "Patent Analysis for Strategic Advantage: Using International Patent Records," Competitive Intelligence Review, vol. 5(1) 27-35 (1994).
Mogee, Mary Ellen, "Patent Citations and Licensing Revenues," Feb. 18, 1998.
Mogee et al., "Using International Patent Data to Identify and Assess Opportunities for Technology Acquisition from Government Research Agencies," World Patent Information, vol. 14, No. 4, pp. 237-244, 1992.
Printed up website for Mogee Research & Analysis Associates, Copyright 1996.
Mogee et al., "Patent Citation analysis of Allergan pharmaceutical patents," 1998 copyright Ashley Publications Ltd. ISSN 1354-3776.
Mogee et al., "Patent Citation Analysis of new chemical entities claimed as pharmaceuticals," 1998 copyright Ashley Publications Ltd. ISSN 1354-3776.
"Patenting Outside the United States," Science & Engineering Indicators 1993.
Mogee, Mary Ellen, "Benchmarking US Competitive Technological Position in Implantable Prostheses With Data on New Products, Patent Families, and Patent Citations."
Mogee, Mary Ellen, "Patents As a Source of Technical Intelligence: Value and Requirements," presented at Frost & Sullivan's Seventh Annual Competitive Intelligence in Business Conference, Apr. 18-19, 2000.
Mogee et al., "Patent co-citation analysis of Eli Lilly & Co. patents," 1999 copyright Ashley Publications Ltd. ISSN 1354-3776.
Mogee, Mary Ellen, "Patents and Technology Intelligence," in Ashton, W.B. and R.A. Klavans, eds. 1997. Keeping Abreast of Science of Technology: Technical Intelligence for Business. Battelle Press, Columbus, Ohio.
Mogee, Mary Ellen, "Using Patent Data for Technology Analysis and Planning."
Mogee, Mary Ellen, "Foreign patenting behaviour of small and large firms," Copyright 2000 Inderscience Enterprises Ltd.
Mogee Research & Analysis Associates International Technology Assessment and Competitive Intelligence Brochure.
Mogee Research & Analysis Associates "Capabilities Statement."
Mogee Research & Analysis Associates "Examples of Recent Achievements."
Mogee Research & Analysis Associates "Competitive Technology Assessment."
Mogee Research & Analysis Associates "International Patent Trend Analysis: Corporate."
Mogee Research & Analysis Associates "Patent Applications and Grants by Country."
Mogee Research & Analysis Associates "Patent Citation Analysis Database(PCAD)."
Mogee Research & Analysis Associates "Patent Citation Mapping."
Mogee Research & Analysis Associates "Patent Co-Citation Clustering: Product Description."
Mogee Research & Analysis Associates "Patent Citation Analysis for Patent Licensing Operations."
Search Results for patent No. 5,991,751 from Patent Application Information Retrieval.
Lerner, Josh, "150 years of patent office practice," National Bureau of Economic Research, Inc., Working Paper 7477, Jan. 2000.
Jaffe et al., "The Meaning of Patent Citations: Report on the NBER/Case-Western Reserve Survey of Patentees," NBER Working Paper Series, Working Paper 7631, Apr. 2000.
Hall et al., "Market Value and Patent Citations: A First Look," NBER Working Paper Series, Working Paper 7741, Jun. 2000.
Jaffe et al., "Geographic Localization of Knowledge Spillovers as Evidenced by Patent Citations," The Quarterly Journal of Economics, Aug. 1993.
Lanjouw et al., "How to Count Patents and Value Intellectual Property: Uses of Patent Renewal and Application Data," NBER Working Paper Series, Working Paper 5741, Sep. 1996.
The Danish Patent and Trademark Office—Consultants' Analysis Report, p. 18-25.
Website www.patentvaluepredictor.com.
Definition of Black-Scholes Formula from Internet.
"StockPricePredictor Launches Patent Valuation Services Web Site," Today's News, printed Apr. 25, 2001.
Letter from Thomas Shroyer Re: Bruce Kruger v. Azotic Coating Technology, Inc. Kevin Bennet, Ronald Kearnes, and Steven Starcke, with enclosures, Jun. 18, 2001.
General Counsel Roundtable Presentation Materials, "Staking Our Claim: Leveraging Intellectual Property for Sustainable Advantage." Presentation by PriceWaterhouseCoopers, "Intellectual Property Advisory Services," Mar. 27, 2001.
Ogden, Christopher L., "Patentability of Algorithms After State Street Bank: The Death of the Physically Requirement," 2001.
ISR for PCT/US00/06691.
US Patent 5,991,751 (cited in ISR for PCT/US00/06691. No copy provided).
US Patent 5,999,907 (cited in ISR for PCT/US00/06691. No copy provided).
Written Opinion for PCT/US00/06691.
US Patent 6,154,725 (cited in PCT/US/00/06691 written opinion. No copy provided).
US Patent 6,018,714 (cited in PCT/US/00/06691 written opinion. No copy provided).
US Patent 5,799,287 (cited in PCT/US/00/06691 written opinion. No copy provided).
US Patent 5,784,696 (cited in PCT/US/00/06691 written opinion. No copy provided).
US Patent 4,334,270 (cited in PCT/US/00/06691 written opinion. No copy provided).
Pressman, David, "Patent it Yourself," Nolo Press Berkely, Jun. 1997, 6th Edition, pp. 4/2-4/8 and 16/13-16/14, see pp. 4/6 and 16/13-16/14 (cited in PCT/US00/06691 written opinion. No copy provided).
IPER for PCT/US00/06691.
Ybarra, Michael et al., "Venture Capital Across America," Upside, Jul. 2001.
Malki, Elli, "Intellectual Property Intensity (IPI) and the Value-Growth Effect," on or after 1997.
Strum, Paul, "Stockscreen: Intangible Benefits," SmartMoney, Feb. 2001.

* cited by examiner

SYSTEM AND METHOD FOR VALUING PATENTS

This application is a US national stage entry of PCT/US00/06691 filed May 4, 2000, PCT/US00/06691 claims priority from provisional application 60/142,961, filed 07-12-1999, and PCT/US00/06691 claims priority from provisional application 60/137,495, filed 06-04-1999.

TECHNICAL FIELD

This invention relates to systems and methods for valuing assets and more specifically to systems and methods for valuing patents.

BACKGROUND ART

Patents are property. In almost all countries that grant patents, the patents have claims that define their property right. Patent claims cover a technology if all steps or components defined by the claims occur in the making or the using of the technology. The owner of a patent has the right to exclude others from the technology that is covered by the claims of the patent. Patents are granted in all countries in the world having significant economies.

Several patent treaties exist. The Paris Convention ("PC") is a treaty that provides a right of priority for an application for patent in one country based upon a patent application for the same invention previously filed in any other PC country. The Patent Cooperation Treaty ("PCT") provides a mechanism to effectively file a single PCT application simultaneously in all PCT countries. The European Patent Convention ("EPC") is a treaty that provides for a single filing, examination, and issuance of a European patent in EPC countries. Similar in effect to the EPC are the ARIPA, OAPI, and other multiple state patent treaties. Data indicating the enforceable term of a patent, (its domestic priority dates, filing date, Paris Convention date, issue date, and terminal disclaimer date), claims, and specification, inventors, owners, classification, level of scrutiny applied in granting or maintaining a patent (e.g., the number of references examined prior to grant and existence of any additional proceedings involving the patent), and additional information about the patent exists within each patent.

Patents are classified by technology area. The two patent classification conventions used worldwide to classify patents are the United States patent classification system, USPCS, and the international patent classification system, IPCS.

Economies are defined by jurisdiction, such as the United States, Canada, the European Union or any of the component countries of that union. Gross Domestic Product ("GDP") is the indicator of all goods and services generated by an entire economy. GDP is an internationally used measure of economic activity of an economy. Other indicators of economic activity for an entire economy are gross corporate earnings, net corporate earnings, and total receipts or sales data. An indicator of economic activity for an entire economy is a macro economic indicator, MEI. MEIs typically are expressed in units of dollars per unit time. These indicators typically measure the economic activity in periods of months, quarters of years, or years. Macro economic indicator data, such as GDP estimates, exist for all countries. For examples see the 1998 WORLD FACT BOOK, CIA, at the URL www.odci.gov/cia/publications/factbook/country.html.

Economies are categorized by sectors. A sector is alternatively sometimes called an industry. A sector is that part of the economy the produces goods and/or services having a set of defined properties. For example, medical devices, pharmaceuticals, and telecommunication services define three distinct market sectors. Each market sector may be divided into sub-sectors, sub-sub-sectors, etc. Several conventions exist to define sectors. One convention is the Standard Industrial Codes, SIC codes, currently being replaced by the North American Industry Classification System, NAICS. Several companies have developed their own sector conventions to categorize economies of the world.

Each sector of the economy produces goods and services that account for a certain fraction of the value of any MEI for an economy. For example, the goods and services provided in the medical devices sector of the economy accounts for a fraction of the GDP of the United States. Values for an MEI or values for a portion of an MEI generated by a sector of the economy is defined herein as macro economic data, or MED. MED also exists and is publicly available, for example, at the www.odci.gov web site mentioned above.

Valuation is an accounting term which means a lump sum of money payable to receive the future benefits of property at a particular time. See Henry A. Babcock, FASA, Appraisal Principles and Procedures, Chapter 6, p. 95, published by the American Society of Appraisers, Washington, D.C.

There are three generally accepted accounting theories for valuing assets: the cost, income, and market value theories. Cost value theory values a property by the cost of replacing the property. Income value theory values a property by the present worth of the net anticipated economic benefit of the property. Market value theory values a property as the present value ascribed to similar property in an active public market. See Smith et al., "Valuation of Intellectual Property and Intangible Assets," published by John Wiley & Sons, Inc., New York, N.Y., Copyright 1994, ISBN 0-471-30412-3, for an in depth discussion of these valuation theories applied to patents, trademarks, copyrights, and other intangible assets. Smith et al. disclose using conventional analysis based upon the cost, income, and market theories to value a patent. The analyses disclosed by Smith et al. require micro economic data, such as sales data indicating the income derived from sale of products covered by the patent (income theory), the revenue derived from licensing the patent (income theory), or data indicating the cost of purchasing comparable patents relating to the patent being analyzed (market theory).

The article "The Economics of Patent Portfolio Valuation," by Jonathan D. Putnam, available on the Internet at the URL www.ip.com/ipFrontline, discusses analyzing data indicating for which patents a company makes annuity payments to rank the relative value that the company associates with each of those patents. The Putnam article does not disclose a means to quantify the value of a patent. U.S. Pat. No. 5,999,907 discloses an intellectual property audit system in which selected patents are compared to the known value of previously licensed patents in order to estimate the value of the selected patents (market theory). U.S. Pat. No. 5,991,751 discloses determining the value of a set of a company's patents based upon the revenues generated by the company for sale of products that map to that set of patents (income theory).

Valuing patents is important for many purposes including determining business balance sheet values, taxes due, acceptable licensing rates, patent infringement damages, and capital allocations. Smith et al. identify intangible assets including patents as accounting for a majority of the value of many major business enterprises. Importantly, Smith et al. identify patent value as a significant portion of the market valuation for many businesses.

The conventional economic valuation of a patent based upon the cost, income, or market value theory is labor intensive, costly, complex, and uncertain. Conventional patent valuation requires an analysis to determine the meaning of the claims, a comparison of products to the meanings of the claims to determine what products are actually covered by the claims, a determination of the market covered by the claims of the patent, and a determination of the cost advantage of the patented technology compared to alternative technologies for that market. The cost advantage determination requires either knowledge of actual market costs or an actual or determination of a hypothetical patent licensing rate. In addition, there is uncertainty associated with any conventional patent analysis due to the risks that the patent claims may be found invalid and that the technology covered by the patent may loose its cost advantage due to development of alternative technologies. In addition, the data necessary for members of the public to perform the conventional economic valuation is simply not available to the public. This is because that data includes relationships between patents, product lines, and product line specific costs and earnings information, and companies rarely release that type of information and often do not even determine that type of information. Thus, the conventional valuation of patents is prohibitively expensive for many purposes, uncertain, and based upon data that often is unavailable to the public.

The distribution of capital for investment occurs in the financial markets. Distribution of capital is based upon investment decisions. Investment decisions are based upon the analysis of the totality of the information available to investors. That information includes financial data, which is defined herein to mean data for a company indicating the financial condition of the company. Financial data for a company includes market capitalization, gross sales, profit margin, shareholders equity, net earnings, and book value. Financial data is available in electronic form from numerous sources, including the major stock exchanges, such as the New York Stock Exchange, and secondary suppliers, such as Data Broadcasting Corporation from their web site www.esignal.com, and from Yahoo Corporation at their web site www.yahoo.com. In an ideal capital market, investors would always invest capital in the most efficient manner, which means that they would invest in the investment that would provide the highest return on their investment. Increased availability of valuation information and the analysis of that information to identify preferred investments promotes economic efficiency by funding investments that will provide the most benefit to society. Since capital allocation is based upon valuation, inefficient valuation of patents results in inefficient allocation of capital.

In summary, the prior art provides no method to objectively and efficiently determine the effect of a patent on the value of a company.

This invention provides fast, efficient, and objective means for valuing patents that can be used for all purposes for which patent valuation is useful, and enables a company's patent portfolio to be used as an indicator of the company's future financial performance. The ability provided by the invention to efficiently and objectively value a company's patents increases the accuracy of financial projections and decreases their cost and therefore results in more efficient capital allocation in financial markets.

DISCLOSURE OF THE INVENTION

Objects of the Invention

A first object of the invention is to provide a computer implemented means for estimating the economic value of ownership of the exclusive rights to a patent, for ownership over a specified period of time, such as a year.

A second object of the invention is to provide a computer implemented means for estimating the economic value of ownership of the exclusive rights to a patent portfolio, for ownership over a specified period of time, such as a year.

A third object of the invention is to provide a computer implemented means for determining or estimating the enforceable term of a patent.

A fourth object of the invention is to provide a computer implemented means for determining the value of a patent for the remaining enforceable term of the patent.

A fifth object of the invention is to provide a computer implemented means for determining the value of a patent portfolio for the remaining enforceable terms of each of the patents in the portfolio.

A sixth object of the invention is to provide a computer implemented means for determining the name of the entity or entities (such as one or a combination of a person, a company, an institution, and a government) owning a patent.

A seventh object of the invention is to provide a computer implemented means for determining the number of enforceable patents and the identity of the enforceable patents owned by an entity as a function of time.

An eighth object of the invention is to provide a computer implemented means for estimating the value of the patent portfolio owned by an entity as a function of time.

A ninth object of the invention is to provide a computer implemented means for predicting the number of patents obtained as a function of future time, the number of enforceable patents that will be owned by an entity as a function of future time, and the value of the patent portfolio owned by an entity as a function of future time.

A twelfth object of the invention is to provide a computer implemented means for determining an estimated value and earnings power of an organization's patent portfolio to its actual value and current earnings.

A thirteenth object of the invention is to provide a computer implemented means for predicting the future earnings, profit margin, capitalization, price to earnings ratio, and stock price of an entity, based at least in part on the patent portfolio of the entity and the predicted evolution over time of that portfolio or its estimated value.

A fourteenth object of the invention is to provide a computer implemented means for increasing efficiency of capital allocation by improving investment decisions.

A fifteenth object of the invention is to provide a computer implemented means for estimating and rapidly communicating to interested people the effect of a patent portfolio on the value of the organization owning it.

A sixteenth object of the invention is to provide patent value based demographic information.

SUMMARY OF THE INVENTION

Definitions

Figure 1:
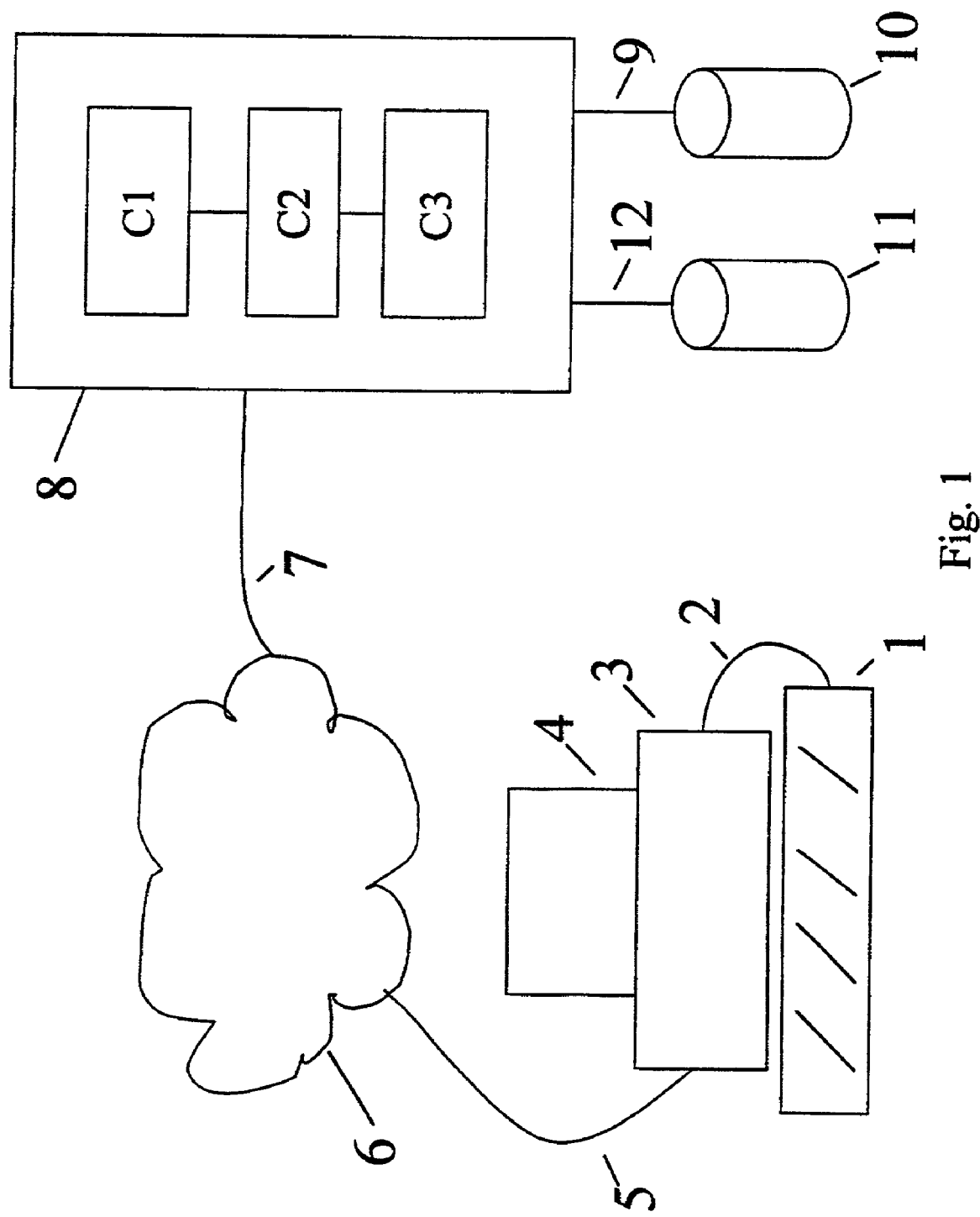
FIG. 1 is a schematic of a novel computer network system implementing the invention.

The fraction of the value of a selected MEI that is due to the sale of goods and services covered by all enforceable patents is defined herein as the Macro Covered Fraction, or MCF of that MEI. The fraction of the value of a selected MEI that is attributable to the sale of goods and services covered by a particular enforceable patent is defined herein as the Covered Fraction, or CF of the MEI for that patent.

Computer Implemented Economic Model

This invention provides a computer system implementing economic models that estimate a CF value for an enforceable patent based at least in part upon the value of a MEI (i.e., an MED) and provides the CF value and valuations based thereupon to a user. The computer system includes at least one digital computer and a database containing patent data. Preferably, the database also contains macro economic data and financial data. The computer system includes programming or hardwired logic which configures the digital computer to use the patent and other data to implement the economic model. For each patent, the economic model can derive CF of an MEI. Preferably, the system uses a macro economic model to derive CF values and patent valuations for substantially all enforceable patents, sums the values by assignee, sector, geographic region, determines trends versus time in the summed values, and extrapolates the trends in the summed values to future times.

Preferably, the economic model also bases the estimate of the CF of the patent on an estimate of the number of enforceable patents. The model preferably provides an MCF (for example 0.9 of GDP or 0.9 of corporate net earnings) either heuristically or based upon objective measure of MCF discussed below, and then preferably apportions the value of the MCF between enforceable patents to estimate the CF of each such enforceable patent. Apportioning the MCF between all enforceable patents normalizes the total value of all enforceable patents to the MCF.

Preferably, the apportioning of MCF to patents is based upon data available in the patents. The data in each patent is used to define relative differences in CF and value between patents. The CF values are defined by their relative values in combination with the normalization of the sum of the CF of all patents to the MCF.

Preferably, the fractions of the MEI attributable to goods and services sold in any sector is apportioned only to patents covering goods and services associated with that sector. That is, while the model discussed above refers to MEI for an entire economy, it is equally applicable using MED for the entire economy or for one or more sectors of the economy, so long as the MED for those sectors is available and the number of enforceable patents associated with those sectors can be estimated or determined.

The invention uses the CF estimates for patents as a basis to value patents. The invention also uses CF as a basis for financial predictions, as explained below. In addition, the invention uses the ability to value all patents as a basis to provide novel patent value based geographic and technology demographics and related economic predictors.

By defining CF and determining CF based upon readily available macro economic data and patent data, the economic model of the invention obviates the labor intensive, costly, complex, and uncertain patent value analysis used in the prior art. In addition, defining and estimating CF for patents enables models that use CF and financial data to predict future financial performance that bypass actually calculating patent valuations.

The invention could also assign values to the provisional rights associated with published applications by apportioning MCF to both patents and printed publications.

MODES OF CARRYING OUT THE INVENTION

Computer System Overview

FIG. 1 shows a computer network including personal computer 3 and its associated keyboard 1 connected via a cable 2, and computer monitor 4. The personal computer 3 includes components for storing data, such as random access memory, magnetic disc drives, optical discs, and flash memory; and also includes a central processing unit and input output control devices. The personal computer 3 also includes email software, client software including a Web browser, and hardware enabling it to communicate via a network connection 5 with the Internet 6.

Also connected to the Internet via a network connection 7 is a computer system 8 (of one or more computers illustrated in FIG. 1 as C1, C2, and C3) preferably running web server software and preferably connected to the Internet 6 via communication connection 7. The computer system 8 is connected via communication connection 9 with a database 10. The database 10 stores patent data including the name of the assignee for each patent and other data describing each patent, and preferably stores financial data for each one of a number of companies, and preferably stores economic data for economies or sectors of economies, which data is described in detail below. The computer system 8 preferably consists of multiple computers locally networked to one another. However the components of the computer system 8 may be spatially distributed, so long as the computer system 8 can perform the functions described below. Although lines indicating cables are shown for communication links, communication links may alternatively be made via any form of wireless communication.

The computer system 8 is connected via communication connection 12 with a user data database 11. The user data database 11 contains data enabling user account management, including in association with one another user names, user passwords, data indicating the number and type of reports transmitted to each user, and may include user session management variables. In addition, the user data database 11 contains data indicating whether the user is entitled via prepayment or credit to receive additional reports and, if so, what types of reports.

Database 10 preferably stores financial data on many companies, including in association with one another for each company, company name, and preferably earnings, gross sales, earnings per share, stock price, number of shares outstanding, market capitalization, and price to earnings ratio. The company data may include historical financial data for the financial data types just mentioned and stock split data indicating when stock splits occurred in association with the ratio of new stock shares to old stock shares for each stock split. In addition, database 10 preferably stores economic data, including MED values for MEIs and each sector's MED for each MEI. The communication lines 9 and 12 may be network connection lines or part of a local computer bus. It is to be understood that all data stored in what is referred to here as separate databases 10 and 11 may be stored in tables of one computer implemented database or in multiple computer implemented databases.

Summary of Operation

In summary of operation of the FIG. 1 embodiment, the user of the client personal computer 3 points the Web browser of the personal computer 3 to an Internet address for an introductory Web page stored on a directory of the computer system 8. As a result, the computer system 8 receives a prompt to send a file to the client personal computer 3, which prompt initiates a user sign up process or a user login procedure. In the user sign up process, the user follows a series of prompts for information to set up an account and obtain a user identification and password, and optionally electronically prepays for the right to obtain reports from computer system 8. The data received from the user is stored in a record for the user in the user database 11, and that data may also include the user's name, address, telephone number, credit card identification, other credit or debit payment identification data, business affiliation, type of prepaid service, email notification data, brokerage account information, investor qualification status, communications opt in data, preferred electronic transmission timing, status as an investment advisor or broker, etc., personal financial income level information, age, public encryption key data, and email addresses to which to send information. If the user already has a user identification and password, the user enters that data, and the computer system 8 sends the user a file by passing the sign up process, and the user follows prompts to define a request for a report.

In response to a user's request for a specified report, the patent report computer system 8 sends a report to the user. The computer system 8 either generates the report in response to the user's specification or preferably had already generated and stored the report specified in the user's request. The reports of the invention are generated by analyzing the patent data and preferably economic data and financial data for a company. In response to the request by the user for a report, the computer system 8 updates the data for the user in the user data database 11 to log the existence of the request, to store the number of requests per month and total number of requests since the user started using the service, the company for which the report was ordered, and the sending of a report to that user in association with an identification of that user, such as the user's email address or name. The system preferably stores the logs the report by the identification of the company, and or the identification of the sector or region of the report.

The report may be included in one or more files, such as HTML files, and it may provide a display showing: a value of a patent; a value of a portfolio of patents; a graph of the number of enforceable patents (i.e., a patent portfolio) versus time associated with a company, a geographic region, or a sector; a graph of the number of the number of patents obtained versus time associated with a company, a geographic region, or a sector; a graph of the value versus time of the patent portfolio of the company, geographic region, or sector; and a graph of the CF versus time associated with a company, a geographic region, or a sector. The graphs preferably include numbers and values at historical times and extrapolations of the numbers and values to future times.

The report on a company may contain financial information on the company, and one or more market sectors and economies associated with the company. The company report preferably includes past, current, and extrapolated future CF (i.e., HPF, CPF, and FPF, where H, C, and F stand for past, current, and future respectively), and past, current, and future PS (i.e., HPS, CPS, and FPS) ratio data. The company report may include an estimate of the value of the company and predict the future value of the company, based at least in part upon extrapolations into the future of the patent data. In addition, the report may provide estimates of the company's future stock price, or stock price range, based at least in part on the foregoing data. The report may include comparisons of the foregoing data for one company, or for a group of companies to data for another company, another group of companies, averages for a sector, or averages for an entire economy. Extrapolations of data are preferably provided using polynomial fits to data or linear regression in a manner that is well known in the art and which methods are implemented in many commercially available computer programs.

Patent Issuance Notification

Since the invention enables estimates of the value of a patent immediately upon the patent's issuance, one use of the invention is to provide rapid notification of the issuance of a patent, for example, to people interested in the financial performance of the company owning the patent, along with either an objective absolute valuation or an objective relative valuation relative to the value of other patents, of the newly issued patent. A similar use of the invention is to provide an email notification of a reassignment of a patent to people interested in the financial performance of the assignee or assignor along with an objective value estimate. Preferably, patent notifications are transmitted to users via email.

The models defining the algorithms that use the patent, economic, and financial data, to generate the report data are identified below.

Valuation of a Patent

The invention uses income valuation theory to provide two alternative methods for valuing a patent based upon CF; one method if the MEI is a measure of goods and services sold (such as GDP) and another method if the MEI is a measure of net income (such as net earnings or profits).

The first patent valuation method equates the patent's CF of net income to net income attributed to the patent. The valuation of the patent can then be determined using conventional income theory in which the income attributed to the patent in future time periods during its enforceable term is discounted to present time by a discount factor referred to in valuation theory as the internal rate of return. The internal rate of return which represents both the time value of money and risk in the continuing existence of CF of for the patent.

The general income theory formula for valuing an asset is:

$$V = \Sigma I/(1+R)^n$$

where $\Sigma$ represents a summation over the n time periods in which a fixed income I is received and R represents the internal rate of return. The general income theory is applied to CF of net income as follows. For a patent having m years remaining and a CF of net income of CFN, the income formula reduces to:

$$V = \Sigma CFN/(1+R)^m.$$

R represents the time value of money and risk. One measure of R is the historical rate of return on common stocks, which is 0.14 (14 percent). R may be sector dependent. Estimates of future variations in time of I may be inserted into the formula.

For example, a patent having two years of enforceable term and a CF of net earnings of $1,000,000.00 would have a value V=1,000,000.00/1.14+1,000,000/1.29=$1,650,000.00.

The second patent valuation method equates the patent's CF of GDP to the sale of goods and services attributable to the patent and multiplies the CF of GDP by a fraction corresponding to the profit margin for products covered by the patent, to obtain a theoretical profit attributable to the patent. The second patent valuation method attributes net income attributable to the patent to the theoretical profit. The profit margin can be based upon macro economic data for the average profit margin in the entire economy, in a sector of the economy with which the patent is associated, or by using a weighted combination of the two profit margins. The assumed profit margin can also be time dependent, and extrapolated to future time based upon the time dependence of the profit margin or rate of growth of the economic sector associated with the patent, the rate of growth or absolute number of patents associated with the economic sector associated with the patent, or other macro economic data.

For example, a CF of GDP of a patent of $10,000,000.00 associated with a sector having an average ratio of net income to gross sales (which ratio is used as a profit margin in this example) of 0.04 provides an net income attributable to the patent of $10,000,000.00*0.04=$400,000.00. The valuation of the patent can then be determined using income formula. For example, if the patent has two years of enforceable term remaining and R is 0.14, then this patent's value is $660,954.00.

Financial Indicators Based Solely on a Company's CF

The CF of a patent has the same units as the economic indicator from which it is derived, which is typically dollars per year. The CF of a patent is a direct (although approximate) indicator of the economic activity covered by the patent in the time period specified for the MED value. The sum of the CF of all patents owned by an organization is referred to herein as the organization's CF. A company's CF excludes competitors from competing in the covered technology. Therefore, a micro economic theory of the invention assumes that all economic activity covered by a company's CF is provided solely by that company, and therefore that a company's CF is an estimate of the economic activity for the company. As a consequence, the trend in a company's CF versus time is an estimate of the trend in economic activity of the company. Further, the ratio of the CF of two companies is a comparison of the relative economic activity of the two companies, and the ratios in the trends in CF between the two companies is a comparison of the relative change versus time of economic activity of those companies. Moreover, an extrapolation to future time of the company's CF is an extrapolation to future time of the economic activity of the company. An extrapolation to future time of the company's CF of GDP, gross sales, total receipts, or some other MEI of total goods and services produced by the company is an estimate of the total goods and services that will be produced by the company. An extrapolation to future time of the company's CF of profits or net earnings is an estimate of the profits or net earnings that will be produced by the company. Similarly, ratios of trends in CF between the two companies are estimates of the relative changes versus time of the future economic activity of those companies.

The computer system 8 uses the historical time dependence of the company's CF and financial performance to predict the company's future financial performance in a number of different ways.

First, the computer system 8 extrapolates from the historical time dependence of the company's CF to the future time dependence of that CF. The computer system 8 assumes that corporate profits, gross sales, and stock price track that time dependence to estimate future values of financial indicators for the company, including net earnings, profits, gross sales, market capitalization, and stock price. Corporate financial indicators include corporate net earnings, profits, gross sales, market capitalization, and stock price. The computer system 8 determines historical CF values for each patent, for example, by determining whether the historical date was during the enforceable term of the patent and setting the CF value for that patent on the historical date to the present value CF for the patent. Alternatively, the CF of the patent on each historical date during which the patent was within its enforceable term may be calculated as a function of the present CF value, the present MED value of the MEI or MCF times the MED, and the historical MED value of the MEI or MCF times the MED.

The company's CF of GDP, CF of gross sales, CF of total receipts, and CF any other MEI relating to total goods and services sold by the company are each an estimate of gross sales of the company. The sum of the company CF of net earnings, corporate profits, or any other CF of an MEI relating to net income is an estimate of the company's net income or profit. The sum of the value of each of the patents owned by an organization is referred to herein as the organizations's patent valuation.

Second the computer system 8 extrapolates from the historical time dependence of the company's patent valuation to estimate patent valuation at future times. The computer system 8 assumes that company's financial indicators tracks that trend to estimate the company's financial indicators. The historical patent valuation for each patent may be determined by applying the income value formula and setting the date used in that formula to the historical date to determine the remaining period of the enforceable term for each patent.

Third, the computer system 8 extrapolates from the historical time dependence of the company's number of enforceable patents to estimate the number of the company's enforceable patents at future times. The variation in time in the number of enforceable patents is an approximation to the variation in time in the CF of a company's patent portfolio. Thus, the variation in the number of enforceable patents extrapolated to future time is also a predictor of the future variation in a company's gross sales and profits compared to current gross sales and profits. The computer system 8 assumes that company's financial indicators tracks that trend to estimate the company's financial indicators.

Fourth, the computer system 8 extrapolates from the number of patents obtained by the company in historical time periods to the number of patents that will be obtained by the company in future time periods. The computer system 8 may assume that company's financial indicators tracks that trend to estimate the company's financial indicators.

Moreover, the computer system 8 preferably also estimates, for a patent portfolio determined by a user, the portfolio's CFs and uses those CF values to derive a valuation for accounting or tax purposes, for example to provide a tax basis in support of a merger, spinoff, or acquisition of a line of business.

Values and trends in patent indicators for one or more companies can be compared to the values and trends for other companies, for averages of the indicators over economic sector, and for averages of the indicators over an entire economy, to predict the financial performance of one or more companies relative to other companies, averages over sectors, and to averages for an entire economy.

Financial Indicators Based Upon a Company's CF and Financial Data

The computer system 8 stores financial data on companies and code implementing financial models discussed below. Based upon the combined patent and financial data, the computer system 8 calculates Patent to Financial ratios, referred to herein referred to as PF ratios, and Patent to Share ratios, referred to herein as PS ratios. The historical, current, and future PF ratios are referred to as HPF, CPF, and FPF ratios. The historical, current, and future PS ratios are referred to herein as HPS, CPS, and FPS ratios.

PF ratios are defined herein as the ratios of (1) the company's CF of GDP, CF of net earnings, or patent valuation, number of enforceable patents, or number of patents obtained in a time period to (2) any of the company's gross sales, market capitalization, net income, or profit (i.e., a ratio of a quantity based upon the company's patents to a quantity based upon the company's finances). The CPF ratios are an indicator of the degree to which the economic activity of a company is covered by or protected by the company's patents. A relatively low CPF indicates relatively ineffective patent coverage of the company's economic activity, implying significant competition and relatively low profit margin. Therefore, the trend versus time in PF (HPF, CPF, and FPF) ratios of a company correlates to and predicts changes in profitability of the company. Further, a relatively large CPF compared to other companies in the same sector, indicates that the company's patent coverage is stronger than its competitors and is an indication that the company's finances may improve.

PS ratios are defined herein as (1) the company's CF of GDP, CF of net earnings, or patent valuation, number of enforceable patents, or number of patents obtained in a time period to (2) to the number of the company's common shares outstanding. Since CF of GDP is an estimate of the gross sales of the company, the CF of GDP PS ratio corresponds roughly to the gross sales per share. Since the CF of net earnings corresponds to the earnings of the company, the CF of net earnings PS ratio is an estimate of the company's earnings per share. Since the company's patent valuation, its other IP assets, and its book value equals the company's market capitalization, company's patent valuation PS ratio is an estimate of the company's value per share provided by activity covered by its patents.

The computer system 8 also compares the PF and PS ratios of one or more companies to other companies, groups of companies, averages over economic sectors, and averages for an entire economy. The ratio of the PF of two companies is a comparison of the relative profitability of the two companies, and the ratios in the trends in PF versus time between the two companies is a comparison of the anticipated relative profitability of those companies. A higher PF ratio for a first company versus a second company, when the two companies provide goods and services in related sectors, indicates that the first company should eventually be more profitable than the second company. If the first company does not have a higher profitability, this suggests that the first company has not fully tapped the market covered by its patent rights, suggesting that the first company's financial condition may improve compared to the second company's financial condition, for example by the first company launching a new product in a market covered by its patents.

It takes a finite amount of time for a company to bring a new product to market. In addition, patents have a finite enforceable live. These two factors suggest that the indications on profitability indicated by comparison of CPFs and profit margins is relevant to predicting financial performance over time scales between the time to bring a new product to market in the sector and the enforceable life of the company's patents. That is typically a time period between several months to twenty years.

The computer system 8 estimates FPF ratios by extrapolating a (or a weighted average of several) from CPF and HPF ratios. From the predicted trends in the company's FPF ratios, the company's known CPF, and current sales and net profits, the company's estimated future gross sales, net income, market capitalization, may be estimated. The statistical significance of these estimates can be measured as proportional to the correlation of the values of the HPF ratios to the best fit of the function used to extrapolate from the HPF values to the FPF values. For example, the square root of the sum of the squares of the difference between each value of an HPF and the value of the fitting function for that historical time, divided by the number of HPF values is the conventional standard deviation measure of the HPF from the fitting function. Low standard deviation would indicate high historical correlation and would suggest the future extrapolation to have high statistical significance. Extrapolation may be based upon any known conventional extrapolation function. Preferably a quadratic polynomial function is used to fit historical data, e.g., by the method of least squares fitting to the historical data, and the resulting coefficients providing the best fitting function (by minimizing the sum of the squares of the differences between the y values of the fitting function and the y values of the data points) defines the function used for the extrapolation. These combined patent and financial data financial models predict a company's future sales, earnings, market capitalization, and, by assuming a price earnings ratio, stock price.

The HPF, CPF, and FPF ratios, as well as the trends in the number of patents, the value of CFs of MEIs, and the patent valuations for one company, can be compared to the ratios and trends for other companies, for averages in an economic sector, and for averages for an entire economy to compare the financial performance of one company to other companies, to average financial performance of an economic sector, and to average financial performance across an entire economy.

The historical time dependence of CF for all patents owned by a company (i.e., its patent portfolio), may be accomplished by identifying each patent issued to the company from the assignee data in each patent, identifying when the patents issued or was published, and determining when the patent expires or expired (using the application date, priority claim dates, issue date, and terminal disclaimer data) in order to define the patents enforceable term.

In addition, patent assignment data can be used to determine patents bought and sold by a company and assigned to the company after the patent issued.

Further, some companies wholly own other companies, and the wholly owned companies are referred to herein as subsidiaries and the owning companies are referred to herein as parents. The computer system 8 preferably groups the patents owned by subsidiaries, and the income generated by subsidiaries, with the parent company, when generating patent and financial estimates for the company. Data identifying parent to subsidiary company relationships is available from government agencies, and specifically freely available in the United States from the Edgar database.

Obviously, the patent based valuations, CF values, patent trends, and combined patent and financial or stock trends may be used as a supplement or in conjunction with more conventional financial estimates based upon readily available financial data for a company, such as corporate earnings, market capitalization, growth rate, etc, to synthesis a more accurate financial prediction. Specifically, a company valuation can be based upon valuation of the company's assets including patents, trademarks, copyrights, contracts, other good will, plants and equipment, supplies, cash, and accounts in addition to the company's patent valuation based upon the method disclosed herein.

Patent Value Based Demographic Analysis

Since the invention enables determination of the CF and value of essentially all patents, the invention provides for demographic breakdowns of the valuation and CFs of patent portfolios associated with each demographic. The demographics include geographic region (defined by the address of the inventors or the address of the assignee of each patent), since patents contain data defining the geographic region of both the owning organization and the inventors of the patent, by sector, by patent classification, and also by assignee, and by any combination of these factors. Thus, historical trends in the value of inventions broken down by geographic regions, countries, economic sectors, assignees, and any combination thereof, can all be provided by a computer system 8 implementing the economic models of the invention. That data can be compared of with macro economic data for the specified geographic region and technology sector and compared sector by sector and region by region to identify areas in which patent CF or patent value is relatively large or increasing relatively quickly. That information in turn may be used to identify regions of high growth, indicating an accelerating regional cost of living, and areas that are relatively attractive for business location in the specified area, and technology areas and geographic locations of companies that are relatively attractive for investment.

Examples of the Economic Model of the Invention

A first example of an economic model of the invention assumes (1) that MCF equals GDP and (2) that every patent has the same CF of GDP. This model equally apportions the GDP between the CF of GDP for all enforceable patents. For example, in this model, if there are one million enforceable patents, and if the MCF is one trillion dollars per year, then the CF of GDP for each patent is one million dollars (MCF of GDP of one trillion dollars per year divided by one million patents).

An alternative to the first model uses the MED fraction of the MEI associated with each sector of the economy, and apportions the MED of a sector of the economy only to patents associated with that sector of the economy. A patent is associated with a defined sector of an economy by correlating the patents USPCS and/or IPCS code directly with a defined sector, or by correlating the patents USPCS and/or IPCS code to a SIC or a NAISC code. The defined sectors may be equal to the sectors defined by the SIC or NAISC codes, or may be defined by sets of SIC or NAISC codes. MEI data for SIC and NAISC codes is readily available. This alternative model granularizes the economy allowing the CF to reflect differences in average value of patents in different technology areas.

Additionally, the economic model may use historical trends in the MED with a sector to predict the MED associated with the sector at future times, and then use those predicted future MED values in estimating the future value of the CF of a patent in that sector.

A example of an economic model providing sector dependence assumes (1) that MCF equals the GDP in the sector and (2) that every patent associated with that sector has the same CF of GDP. This model equally apportions the GDP of the sector between the CF of GDP of all enforceable patents associated with that sector. For example, in this model, if there are one thousand enforceable patents associated with the medical devices sector, and if the GDP attributable to the medical devices sector is two billion dollars per year, then the CF of GDP for each associated patent is two million dollars per year (MCF of CF of GDP two billion dollars per year divided by one thousand patents).

Depending Relative Patent Value on Relative Value Characteristics

The economic model preferably depends the CF of each patent upon a relative value number. The relative value number is defined as the value of a function of the values for relative value variables of a patent. The relative value variables are measures of relative value characteristics of a patent. The relative value characteristics include (1) characteristics intrinsic to the patent as published, issued, or subsequently amended and (2) extrinsic characteristics. The intrinsic relative value characteristics include (1) "at issue" characteristics and (2) "post issue" characteristics.

The relative value variables based upon "at issue" relative value characteristics include measures of the lengths of data fields in the patent (including the claims, the description or specification, domestic and foreign patents cited, non patent references cited), the number of entries in data fields in the patent (including the number independent claim of each class (classes including method, product, system, composition, manufacture, product by process), the total number of independent claims, the total number of claims, the number of different classes of independent claims (i.e., two if the patent contains method and system claims), the number of domestic and foreign patent cited, number of examples, number of figures, number of domestic and foreign priority claims), and the existence of lack of existence of data fields in a patent (including domestic, Paris Convention, and foreign priority claims, disclaimers, PCT data, pre issue oppositions, appeals, and term extensions), the length of the pendency of the application, and the length of time from the domestic and foreign priority date until issue. The values of these at issue relative value variables each provide an indirect indication of the breadth of the claims and the value of the technology covered by the claims. The net effect of all of the relative value characteristics for a patent are reflected in the relative value number for that patent.

Measures of the length of a claim include the number of characters, words, paragraphs, columns of text, pages of text, number of graphics, or area of text or graphics on a printed or displayed page) or function of values derived from a combination of these measures.

Measures of the length of the description (also called specification) of a patent include the number of characters, words, sentences, paragraphs, columns of text, or pages of text, number of figures, number of examples, number of graphics, area of text and graphics on a printed or displayed page or function of values derived from a combination of these measures.

The relative value variables based upon "at issue" relative value characteristics also include the issuance from a PCT application, regional application, and if issued from a PCT application or regional application, then the number of countries designated in the PCT or regional application.

The relative value variables based upon "at issue" relative value characteristics also include the number and type of cited references cited (United States patents, other national or regional patents, or non-patent references), and the type of patent (such as reissue, utility, design, plant, seed, industrial design, utility model, invention registration, inventor certificate, and examined or unexamined patent).

At issue and at publication relative value characteristics do not include any data pertaining to whether products are covered by the claims of the patent.

Post issue characteristics include the existence of post issuance certificates, such as a certificate of correction, a certificate of reexamination, the length of claims in any post issuance certificate, the existence of increase or decrease in the length of any claim in a post issuance certificate, and a notice of proceeding in a patent office to reconsider the validity of a patent, such as a patent opposition proceeding, a patent reexamination proceeding, an interference proceeding, and a patent reissue proceeding.

Extrinsic relative value characteristics include any notice of litigation involving the patent, a notice of settlement of a litigation involving the patent, and a notice of a regulatory product review citing the patent. Of particular note for a medically related patent is a notice of regulatory review of a product or process covered by the patent.

Extrinsic relative value characteristics also include the existence and number of corresponding foreign patent applications or patents (e.g., a US, PCT, EPC, or Japanese application claiming priority to the same application as the subject patent), the existence of litigation and post issuance proceedings involving corresponding foreign patent applications or patents, and the number of subsequently issued patents in a specified time period covering a specified time after the issuance of the subject patent citing to the subject patent.

The relative value function may depend upon any of the intrinsic at issue, after issue, and extrinsic characteristics.

Each relative value characteristic has an effect on the relative value of the patent compared with the value of other patents, or other patents in a related field. The claim based relative value indicators are strong indicators of relative value of patents. The shorter the independent claims and the more numerous the independent claims the broader the coverage provided by them and therefore the more valuable the patent. Moreover, the longer the specification, the larger the number of examples and figures, the more valuable the patent. Further, any unusual post issuance activity, such as a notice of reexamination, or a reissue or litigation involving the patent is a strong indicator that the patent is relatively valuable. The existence of corresponding foreign applications indicates the assignee considered the invention valuable in enough to pursue expensive international protection and is also a strong indicator of value. All of these value considerations are heuristically included in a value formula to provide a quantitative estimate of relative value of each patent associated with a sector or the entire economy. Once these relative values are known, the absolute CF values for the patents associated with a sector or the entire economy may be obtained by normalizing the relative patent values so that the sum of the CFs equal the MCF of the MED of the MEI for the corresponding sector or entire economy.

In the economic models of the invention, the CF of each enforceable patent is preferably determined by defining the CF of the jth patent associated with sector i ($CF_{ij}$) equal to a normalization constant $C_i$ for sector i times the jth patent's relative value number $NEP_{ij}$. The CF for each patent associated with the ith sector is determined by solving for the normalization constant $C_i$ for the ith sector in the corresponding ith equation of the set of equations:

$$MCF_i = \Sigma CF_{ij} = \Sigma C_i * NEP_{ij}$$

Summation over j for all patents in the ith sector solves for $C_i$. This procedure ensures that the sum of the normalized estimated values for all of the enforceable patents equals the MCF.

In order to provide a rapid indication of the value of each enforceable patent upon its issuance by avoiding the summing over all enforceable patents in a sector to solve for the computer system 8 may use predetermined values for $C_i$ and calculate a relative value number for a patent, and identify the CF for that patent equal to the predetermined value for $C_i$ times the relative value number for the patent. Compared to the number of enforceable patents, a relatively small number of additional patents issue or are published periodically, typically weekly. Accordingly, using predetermined $C_i$ values based upon previously issued patents provides a relatively small inaccuracy.

Similarly, if an actual CF value or a patent is know (as opposed to the nominal values determined by the economic model of the invention), then those actual values may be substituted for the nominal values when determining $C_i$.

Determining MCF

The MCF may be one. The MCF is in the range zero to one.

The MCF reflects the fraction of GDP covered by patent rights. The fraction of GDP covered by patent rights is a function of the rate of technological improvement. Accordingly, MCF may be determined by a measure of the rate of technological improvement.

Defining MCF as the Ratio of Intangible to Total Assets

One measure of the rate of technological improvement is the ratio of the intangible assets to total assets in the jurisdiction. Total assets are the sum of tangible assets (such as the value of buildings and equipment) and intangible assets. A measure of total asset value is the sum of the market capitalization for companies whose stocks are publicly traded. A measure of tangible assets is the sum of the book values for companies whose stocks are publicly traded. Therefore, the ratio of intangible assets to total assets equals the ratio of (the sum for publicly traded companies of market capitalization minus book value) divided by the sum for those companies of the market capitalization. This MCF indicator may be broken down by economy, or by sector of the economy, by associating companies with a jurisdiction, or by associating companies with both a jurisdiction and a sector of the economy.

Defining MCF as the Ratio of Earnings to Gross Sales

The MCF may also be based upon economic data indicating the rate of technological improvement. One indicator of the rate technological improvement based upon economic data is the ratio of earnings to gross sales, i.e., profit margin. This is because companies in sectors with rapid technological improvement and have relatively valuable patent rights covering each companies products. Each companies patent rights limits its competition allowing the company to enjoy relatively large profit margins. Per contra, sectors with relatively small rates of technological improvement are commodity industries in which competition drives down profit margins thereby providing relatively low earnings to gross sales ratios. Profit margins for sectors are readily derivable from available economic data enabling the MCF to be sector dependent to account for differences in high and low rate of technology change sectors. Other indicators of the rate of technological change in an industry or sector can be derived from macroeconomic data and financial data for public companies each industry or sector.

The sector MCF may be a function of the indicator of the rate of technological improvement scaled to preferably having a range of zero to one. For example, for the ratio of earnings to gross sales for each sector i, $REG_i$, assume the highest sector value is 0.9 and the lowest sector value is 0.1. The MCF for each sector $MCF_i$ may be scaled so that:

$$MCF_i = (REG_i - 0.1)/(0.9 - 0.1).$$

Estimate of the Number of Enforceable Patents

Preferably, the number of enforceable patents is determined by summing over all patents the number of patents determined to be within their enforceable term.

Alternatively, the total number of enforceable patents can be estimated as the number of patents issued in the jurisdiction during a prior period equal to the average enforceable term. The number of enforceable patents may be estimated based upon statistical data for patents. In the United States, patents are typically enforceable for 17 years from issue or twenty years from domestic priority date. In most other jurisdictions, patents are enforceable for 20 years from their domestic priority date. Moreover, most jurisdictions have maintenance or renewal fees, and a certain fraction of those fees are not paid. Accordingly, the average enforceable term of any patent is less than twenty years. In the United States, the average enforceable term is currently approximately fifteen years from issue date. In the other jurisdictions in the world, the average enforceable terms are believed to range for ten to fifteen years.

Patent to Sector Correspondence Based Upon Patent Classifications and Industrial Classification Codes The sector to which a patent corresponds can be defined using the patent classification of the patent and corresponding those classifications to industrial classification codes, such as the SIC or NAISC codes.

First, a correspondence between the US or International patent classification systems to sectors of the relevant economy can be heuristically defined.

Second, patent may be associated with a sector by correlating the words describing the patent classification (USPCS OR IPCS) to the words describing each one of the SIC or NAISC codes, and assigning the patent to the SIC or NAISC having the highest correlation. For example, when correlating the patent to the NAISC codes, the words describing a USPCS for the patent may be compared to the words describing each one of the NAISC 2, 3, 4, 5, or 6 digit sectors. The patent may be assigned to the two digit codes for the NAISC code with which the words describing the patent's USPCS coder are most highly correlated. One example of a correlation function is a function that provides a value of one each time a word in the description of the USPCS code is identical to a word in the description of an NAISC code, and zero otherwise. Alternative correlation functions may weight matching words in the lower (e.g., 2 digit description) more highly than matching words in the higher (e.g., 3) digit descriptions, or less highly depending upon which method is heuristically determined to provide more accurate results.

If a patent has one patent classification, it will have one sector classification. If the patent has multiple patent classifications, it may have multiple possible sector classifications in which case the patent may be associated with the sector associated with its primary patent classification. Alternatively, the patent may be associated with several sectors, and the weight, for the purposes of defining the number of patents associated with each sector, given to each association may depend upon the relative number of the patent's patent classifications associated with that sector compared to the total number of patent classifications. In this alternative, in effect, fractions of the patent may be associated with different sectors by weighting the normalization constant $C_i$ by that fraction. If the patent has several classifications, the CF values for the patent could be defined as a sum of corresponding fractions the CF values determined for each sector.

An example of a patent classification correspondence with sectors is the SNAP database sold by the United States Patent and Trademark Office corresponding the USPCS to 41 sectors defined by two digit SICs.

Patent to Sector Correspondence Based Upon Correlation of Words in the Patent

A patent may be associated with a sector by correlating the words in the patent's title, abstract, description, or claims or any combination thereof, and any weighting to the different sections of the patent, to the words describing the sector or industrial classification. For example, when correlating the patent to the NAISC codes, the words in the title of a patent may be correlated to the words describing each of the NAISC 2, 3, 4, 5, and 6 digit defined sectors. The patent could be associated with the NAISC code or codes having descriptive words that are the most highly correlated to the words in the patent's title abstract, description, or claims. The same type and weighting of correlation functions discussed above for patent classification and industrial sector descriptions may be employed.

Database Schema

Figure 2:
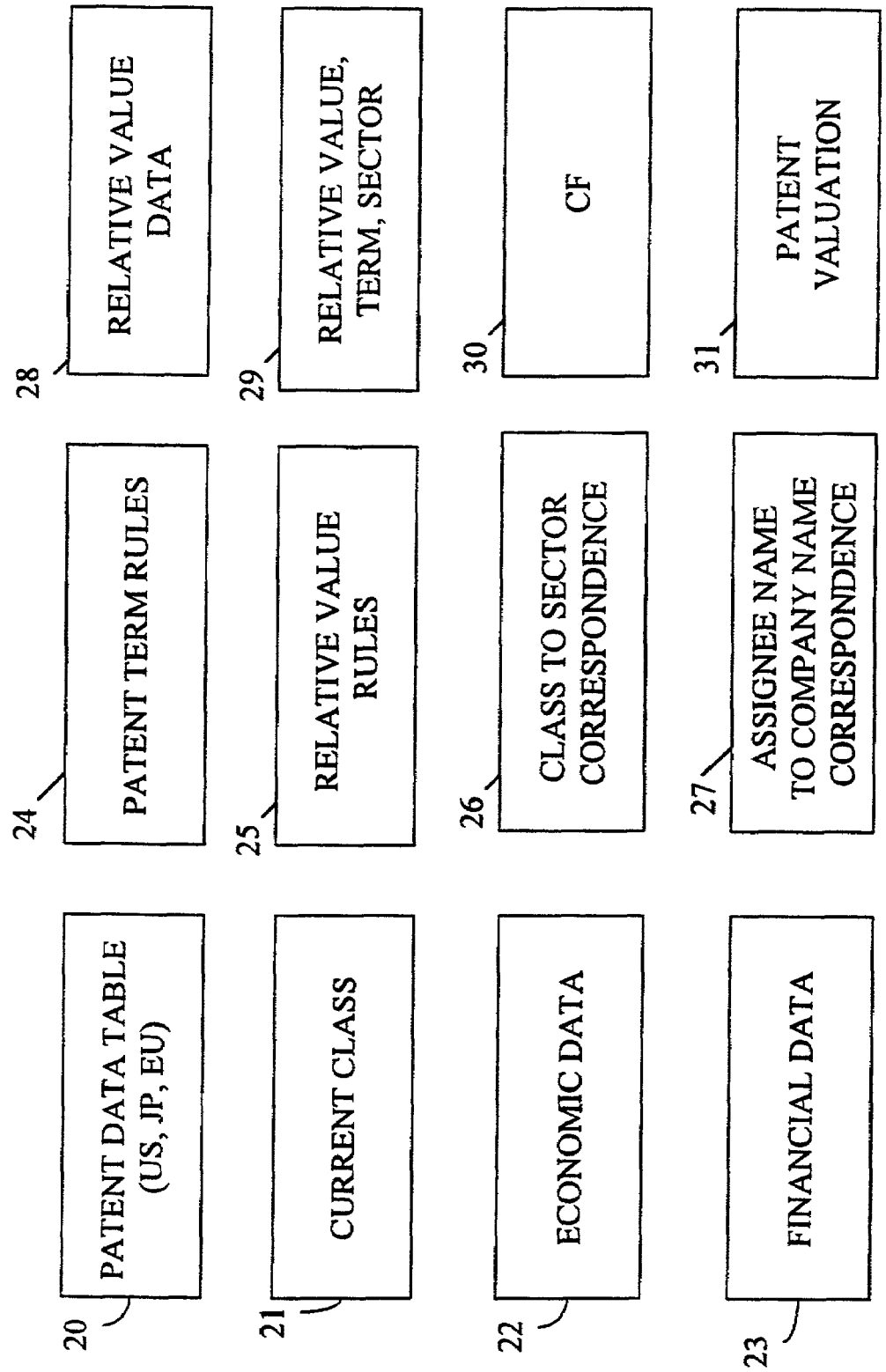
FIG. 2 is a schematic showing tables of the novel database of FIG. 1.
Figure 3:
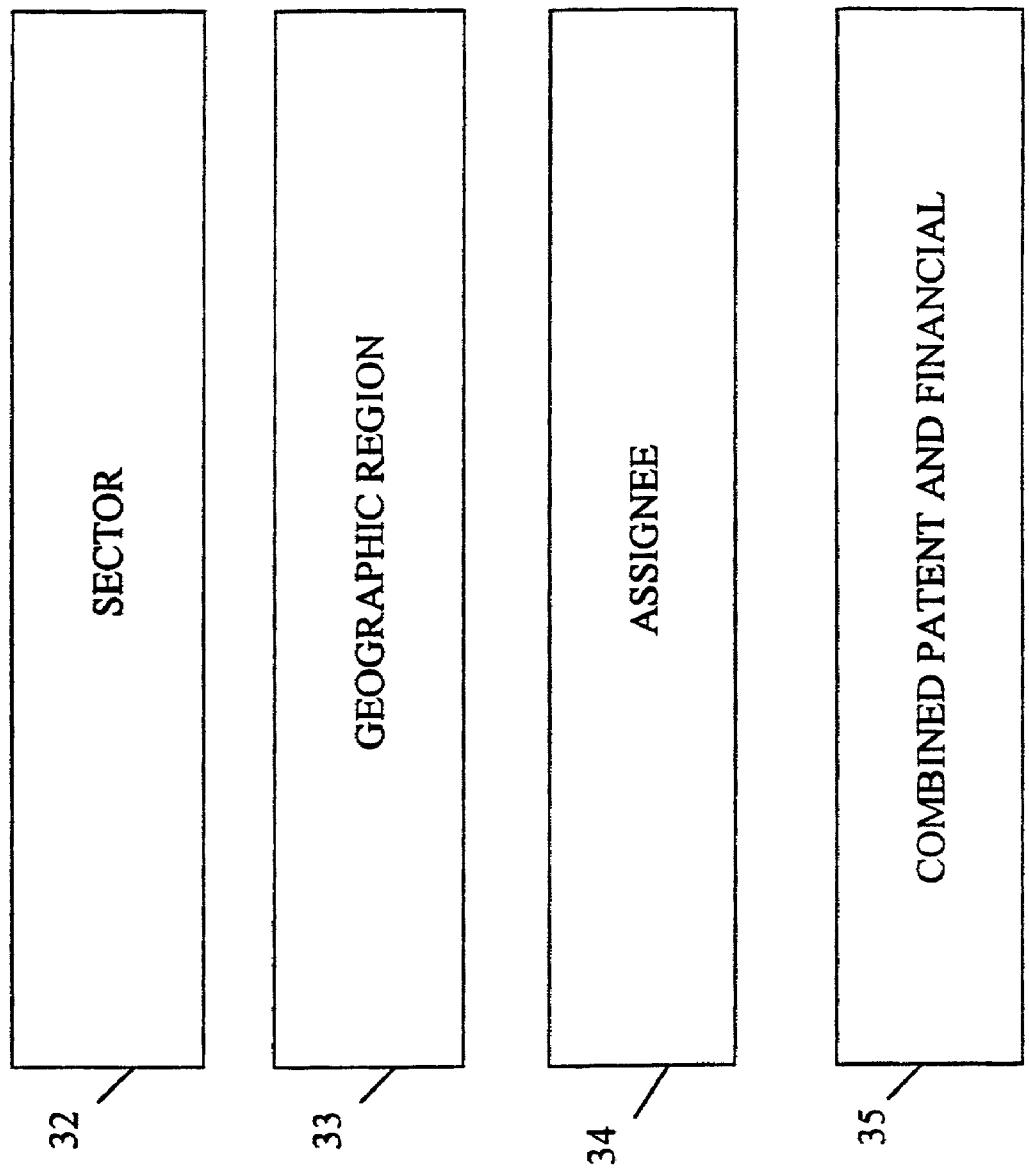
FIG. 3 is a schematic showing tables of the novel database of FIG. 1.

FIGS. 2 and 3 are schematics showing tables 20-35 of the novel database 10 of FIG. 1. As used herein table refers to both a database table as used in the programming art and a table of data resulting from a database query, database manipulative operation, database calculative function, or database report operation. In addition, while some of the tables are described containing duplicate data fields for ease of understanding, it is to be understood that in practice the duplicate data fields may not be included in multiple table and instead are accessible based upon links between the tables.

Table 20 includes actual patent data which may include the alphanumeric textual contents of the patent and post issuance changes to the patent. The combination of the patent number and country forms a unique identification of each record in table 20.

Each record in table 20 may include the fields storing the textual contents of the patent including: identification of the jurisdiction issuing the patent; identification of the jurisdiction or jurisdictions in which the patent is enforceable (e.g., the United States, Japan, or the European Union); identification of the patent unique to its issuing jurisdiction (typically referred to as the "patent number"); title; abstract; specification; claims; an assignee code uniquely identifying each assignee; the name of the assignee; the street address of the assignee; the city of residence of the assignee; state of residence of the assignee; the state of incorporation of the assignee; the name of any co-assignee; the street; city; and state addresses of the co-assignee; the state of incorporation of the co-assignee; the USPCS and IPS classes of the issued patent; citations of United States patents cited as references in the patent; citations of foreign patents cited as references in the patent; citations of non-patent references cited in the patent; the name of each named inventor in association with the inventor's address; the USPCS fields of the examiner's prior art search; the IPS fields of the examiner's prior art search; the name of the primary examiner; the name of any assistant examiner; the name of the legal representative for the patentee; the existence of any government interest in the patent.

In addition, each record in table 20 may also include textual content fields that may be relevant to the enforceable term of the patent, including: application number; application date; issue date; terminal disclaimer date; terminal disclaimer patent number, any terminal disclaimer patent number's expiration date; priority application numbers; the filing dates, issue dates, and patent number for any priority applications, foreign priority application identification; foreign priority application country of origin; foreign priority application filing date; indication of the patent being expired; indication of the patent being withdrawn; indication that the patent term was extended.

In addition, each record in table 20 may also include fields containing information on changes to the patent that occur after it issues, including: USPCS reclassifications, IPC reclassifications; text in a certificate of correction, text in a certificate of reissue, text in a certificate of reexamination, cancellation of claim in an interference or opposition or the like proceeding, holding of invalidity or unenforceability in a court proceeding, litigation proceeding involving the patent, and USPCS and IPC reclassifications of the patent after it issued.

Alternatively, table 20 may be broken into one table for each jurisdiction in which case the patent number field may be used as the primary key in the table for each distinct jurisdiction.

Table 20 includes actual patent data which may include the alphanumeric textual contents of the patent and post issuance changes to the patent. Patent data in machine readable memory formats (e.g., stored on tape, magnetic or compact discs) for patents are available. For example, files each containing data for one United States patent are available from the searchable databases at the USPTO web site. The data file for a patent obtained from the USPTO web site can easily be interpreted and reformatted to provide the fields identified for table 20. This is because the vast majority of such data files for patents are formatted according to a standard format pattern. For example the data available for the text of each patent from the USPTO web site consists of a file containing segments delimited by HTML <HR> tags. Each segment in such a file contains the data for one or more of the fields identified for table 20. Characteristic strings (i.e., data in character format) exists at in a fixed relation to the beginning and/or end of each field in a multi field segment and can be used to delimit each field. Based upon the existence and location of the segment and field delimiters, each field in the data file can be parsed out. Moreover, each segment contains characteristic strings which can be used to verify that the file being examined exists in the format pattern. For example, the format pattern may has the "description" segment following the segment whose only content is the word "Description." In regularly formatted patents, the description segment is delimited by a <HR> HTML tag before and after the description. In regularly formatted patents, that sequence identifies the description segment. However, some data files for patent do not follow the format pattern. That is, some files are improperly formatted. For example, some data files from the USPTO have no segment whose only content is the word "Description." In these patents, the "description" segment may be alternatively identified as the segment with the phrase "BACKGROUND OF THE INVENTION." In patent files that contain neither a "Description" segment nor a "BACKGROUND OF THE INVENTION" phrase the "description" segment may be assumed to be included in the longest segment in the file. If no parent case data segment exists, the parent case segment may arbitrarily be assumed to be the first two paragraphs or first 1000 characters of the longest segment and the description segment to be the remainder of the longest segment.

Less extensive patent databases are searchable for the Japanese patents at the Web site for the Japanese Patent Office, for European patents at the Web site for the European Patent Office, and for the Patent Cooperation Treaty patent applications at the Web site for the World Intellectual Property Office. In addition, published United States patent applications will be available from the USPTO web site in the near future. The files available from all of these sites may be parsed in order to identify the text for each field of each patent. Moreover, the industrial property offices of many countries provide a single file containing raw patent data for large numbers of patents or published applications for a nominal fee, and also post issuance corrections to patents. For example the USPTO sells CD rom products containing USPCS reclassifications, indications of which patents have been corrected via reexamination, certificate of correction, reassignment, etc., and this data can be exported from these products and incorporated in table 20.

Preferably the database contains table 21 which relates patents to their updated patent classification. Table 21 contains records that contain fields including: patent number, country, identity of the current class of each patent. The current classification data may be the patent number's current USPCS or IPC class or classes. Preferably, each record contains data for only one USPCS class and one IPC class. The combination of patent number and country forms a unique identification for each record in table 21.

Table 22 contains economic data. Each record in table 22 contains fields including: identity of an economic sector, fraction of GDP (or fraction of an alternate macro economic indicator) associated with that sector, and fraction of net corporate earnings (or fraction of an alternate measure corresponding to net earnings) associated with that sector, and preferably average profit margin for the sector. The sector forms a unique identification for each record in table 22.

Table 23 contains records that contain fields including: company name, company ticker symbol if one exists, and several financial indicator data fields. The company name forms a unique identification for each record in table 23. The financial indicator fields in table 23 may include: gross revenue, net earnings, book value; share price; shares outstanding; market capitalization; gross revenue per share, net earnings per share; book value per share; gross revenue per employee; net earnings per employee; book value per employee; gross revenue divided by book value (asset turn over). Shares outstanding are the number of shares owned by shareholders excluding those owned by the corporation. Book value' represents the value of the company as it is listed in the company's books after all the liabilities are subtracted. The book value does not include intangibles such as patents and copyrights. In addition, each company financial record may contain fields listing the names of wholly owned subsidiaries.

Table 24 contains records that each include fields including: identity of a jurisdiction, type of patent, and an algorithm that determines the beginning date and end date of the enforceable term for that type of patent in that jurisdiction. The identity of the jurisdiction forms a unique identification for each record in table 24. The function is typically a function of the patent's priority date, filing date, issue date, terminal disclaimer, and applicable special or general term extensions laws. For example, in Europe and Japan, the algorithm identifies the grant date as the beginning date and a fixed duration from the national priority filing date (e.g., 20 years) as the end date. In the United States, the function is much more complicated. In the United States, the beginning date has always been the grant date. In the United States, if the application from which the patent issued was filed prior to Jun. 8, 1995, then the term is generally 17 years. If the application was filed after Jun. 8, 1995, then the end date is generally 20 years from the earliest United States priority filing date. Under newly enacted legislation, the end date for newer patents is generally the longer of 17 years from the issue date or 20 years from the filing date. In most countries, the term date may be shortened for a variety of reasons in which case the shortened date is contained in the granted patent. In certain instances, patent terms are extended beyond the general term and that fact is normally contained either in the granted patent or available in electronic form from some government agency. In the United States, for example, drug patent term extensions are available from the Web site of the Food and Drug Administration, and from their publication called the "orange book.".

Table 25 contains records that contain fields including: identity of the jurisdiction; the type of patent; a function that determines relative CF values from value characteristics of the patent. The identity of the jurisdiction forms a unique identification for each record in table 25. Each type of patent (e.g., design or utility) in each jurisdiction has different relative value rules associated with it. Each record in table 25 contains data defining a relative CF value function applicable to that type of patent. An example of the relative value function for United States utility patents is F where F=f1 (number of assignees)*f2(number of US patent references cited)*f3 (number of foreign patent references cited)*f4(other references cited)*f5(Number of claims)*f6(Number of independent method claims)*f7(number of independent product claims)*f8(Number of characters in shortest independent claim)*f9(Number of characters in specification)*f10(Number of figures)*f11(Failure to pay a first, second, or third maintenance fee)*f12(Reexamined once)*f13(Reexamined twice)*f14(Reexamined thrice)* f15(Existence of Certificate of correction)*f16(Existence of Term extension)*f17(Existence of Notice of litigation)*f18(Claim priority in PCT)*f19 (Claim priority in EPC)*f20(Claim priority in Japan)*f21 (Patent type)*f22(a priority claim in the US patent to a foreign priority application)*f23=(Type of patent) or f24 (patent value determined by a conventional valuation process). Each of the functions f1 through f23 attains a value of 1 if there is no data present (null value) in the corresponding data field. In addition, F=f24 is f24 contains a value and the function f24 attains a value zero if there is no data present in it (null value). Alternatively, F is a sum of functions f1 to f23, or equals f24.

Table 26 is a table containing data relating patent class data to corresponding economic sector data. Table 26 contains fields that each include a USPCS or IPS class, or both, a corresponding NAISC or SIC sector code. The patent class forms a unique identification for each record in table 26.

Table 27 contains records each including: a company name and one or more assignee names that identify the same entity as the company name. The company name forms a unique identification for each record in table 27. It should be noted that the patent assignee name in table 33 and the company name in table 23, for the same legal entity, may not be the same. Assignee names are typically the exact name of a legal entity such as a corporation. In contrast, the company name associated with company financial data maybe an abbreviation or alteration of the actual recorded legal name of the corporate entity. However, simple database query and select rules may be used to automatically obtain an accurate correspondence for entities between their assignee name in table 21 and company or "stock name" in table 24, and that table may be visually reviewed and corrected for any inaccurate correspondences. For example, company name and assignee names may be automatically corresponded by assuming the following rules: the first word in the company name is the same as the first word in the assignee name, and the first four letters of the second word in the company name are the same as the four three letters in the second word in the assignee name, and the first two letters in the third word in the company name are the same as the first two letters in the third word in the corresponding assignee name. These criteria can be used to reliably match up the assignee and stock or company names corresponding to the same entity. Data identifying wholly owned subsidiaries is available from government agencies, for instance provided in the United States by the Commerce Department's free Edger database available on the Web.

Table 28 contains fields for relative value characteristics data for each patent, which include: the number of the claims; the total number of independent claims; the number of independent method claims; number of independent product claims; number of independent system claims, number of independent composition claims; number of independent manufacture claims; the number of other types of independent claims; the length of each independent claim; the length of the specification; the number of the figures; the number of the examples; the existence of any foreign priority claim; the existence of a national priority claim; the existence of a Paris Convention claim; the issuance from a PCT application; the number of countries designated in the PCT application; the number of cited national patent references; the number of cited foreign patent references; the number of cited non-patent reference; the time from the priority filing date to the issue date; the time from actual filing date to the issue date; the type of patent (utility, design, reissue, or plant, utility model); existence of post issuance certificate of correction, the existence of a certificate of reexamination, the length of claims in any post issuance certificate, the existence of a notice of litigation involving the patent; the existence of a regulatory review of a product covered by the patent; the number of corresponding foreign patent applications (e.g., a US, PCT, EPC, or Japanese application claiming priority to the same application as the subject patent), the number of related national patents all claiming priority to the same application, and the number of subsequently issued patents citing to the subject patent. The identification of the patent forms a unique identification for each record in table 28.

The length of the claims and the description (also called specification) may be measured as the number of characters, words, lines, or paragraphs. In addition, if the claims or specification include expressions of the formula, graphical, equation, or even sequence type, each such type of expression may be assigned an equivalent length in number of characters, words, or paragraphs. The equivalence is to a heuristically determined equivalent number of characters needed to express the formula, graph, or equation, in words, and is preferable equal to 80 characters. In addition, the length of the claims can be measured by the two dimensional area they each occupy in a printed patent or in screen area on an electronic monitor in an electronically published patent.

The length measure defined herein is a measure of the breadth of the claim since the shorter the claim the less limitations it has and therefore the broader its coverage. However, language claiming alternatives does not follow that rule since the length involved in claiming alternative limitations is longer than the length of claiming a single limitation and therefore the determined length of a claim may be adjusted in an objective way to account for the effect of alternative language on the breadth of a claim. Therefore, alternatively, the existence of alternative language in a claim may be assigned a length value different than the actual language of the text in the claim. For example, the text of a claim reciting a Markush group via the phrase "selected from a member consisting of" or simply including the word "or", or the definition of an expression in which a variable can have multiple alternative values, may be assigned a length value based upon heuristic analysis of the relationship between the scope of such claims and the value function associated with the relative length of the claims. This is because, even though a claim covering a Markush group is broader than a claim covering a single species of that group, the recitation of a Markush group is longer than the recitation of a single species. Since the preferred relative value function associated with the "length" of a claim is inversely proportional the length of the claim, the preferred relative value function will give anomalous results unless the existence of a Markush group is compensated for by assigning a claim length to a Markush group containing claim that is less than the actual claim length. For example, the length calculation for a claim may be decreased by a number of characters, such as 80 characters, or by a percentage amount, such as by twenty percent, when the claim is determined to contain a Markush group or an alternative recitation.

The relative value characteristics fields in table 28 may also include: number of assignees; number of examples, number of figures, number of United States patent references cited; number of foreign patent reference cited; number of non patent references cited; number of figures; number of temporary lapses of enforceability; number of reexamination proceedings; number of certificates of corrections, number each type of patent term extension, number of litigations involving the patent, existence of a priority claim to the application that matured into the patent in a PCT, EPC, other patent convention, or in foreign national application; the type of patent (e.g., utility, reissue, design, plant, seed, utility model, or design), conventional patent valuation. Here, a conventional patent valuation means a valuation obtained by using sales of products identified as covered by the patent and the life of the patent.

The length of the claims, whether each claim is independent or dependent, and type of claim (product, method, system, device, etc.) may be automatically determined from the data in the patent data table. Each claim can be delimited from the claims field of a data file for a patent. The claims field, beginning and ending of each claim, independence of each claim, and type of claim may be identified from the date in the claims field using a set of programmatically implemented rules. The claims in the claim field may be delimited by identifying the beginning of each claim. The beginning of the nth claim in the claims field may be identified by matching the existence of a first character string having a sequence meeting the following criteria: (1) a non ASCII character (e.g., a line break), the number n, a blank space, either a capital letter or a numeral or a graphics indicator and (2) no subsequent string in the claims section contains a character sequence of a non ASCII character, the number n, a blank space, either a capital letter beginning one of the words "A", "An", or "The" or a numeral or a graphics indicator, and (3) if there is a subsequent string in the claims section that contains a character sequence of a non ASCII character, the number n, a blank space, either a capital letter beginning one of the words "A", "An", or "The" or a numeral or a graphics indicator and the capital letter in the first string begins one of the words "A", "An", or "The." The previous rule or a generalization thereof may be applied to a patent data file in any language containing articles, or containing definite and indefinite articles like "A"; "An"; and "The". Another rule that is useful for determining the beginning and ending of claims is the existence of a claim separator in code containing the claims, such as an HR HTML tag. A further rule that may be useful in determining beginning and ending of claims is identification of a character string containing a sequence of characters in which the first character is a period, the next ASCII character is a number signifying the beginning of a claim, the next character is a period, and the next character is a blank space. A further rule that may be useful for determining beginning and ending of a claim is identification of a character string containing a sequence of characters in which the first character is a period, the next ASCII character is preceded by a non ASCII character and is a number signifying the beginning of a claim, the next character is a period, and the next character is a blank space. Generally, the determination of the end of one claim and the beginning of the next claim includes three rules. The first rule is identification of a first string of characters in the claims section that is a member of a set of strings that are highly characteristic of the beginning of a claim and that each include a number, and ranking the members of the set by the likelihood that they signify the beginning of a claim. The second rule is determining the location of any subsequent string falling into the set and ranked more likely to be the beginning of the claim to be the beginning of the claim, subject to location of a still subsequent string within the set and ranked more likely to be the beginning of the claim. The third rule is to start at number one (i.e. assume that the claims start with claim number one). Thus, in determining the beginning and ending of the n+1 th claim, the claim determination algorithm checks the remainder of the claims section for matches to the strings in the highly characteristic set and containing the n+1 th number.

The length of the description may be determined in Web pages for patents by identifying the HR delimiters for that field.

An independent claim is a claim that does not refer to any other claim. A claim refers to any other claim if it contains the phrase "claim n" where n is the number of the other claim. In addition, possible formal errors in the claims, such as misspellings of "claim" and failure to include the "n" reference number may be accounted for by defining any claim containing the word "claim" to be independent, and any claim containing a phrase characteristic of a dependent claim, but for the existence of the word claim, such as "according to n" where it is likely that this phrase is supposed to read "according to claim 1" to be part of a dependent claim. Similar phrases are as "as in"; "defined in"; "set forth in n"; "in accordance with n"; "as specified in n".

In addition, an independent method claim is an independent claim that recites "method" or "process" or a misspelling of "method" or "process" and that does not define a product by process claim. A product by process claim is characterized by containing one of the phrases "product formed by the process" or misspellings thereof; and alternatives thereof such as "product formed by a process"; "product formed by the method"; "product formed by a method"; "made according to a method comprising the steps of"; and "made according to a method comprising the steps of." The number of examples may be determined by examining the text in the description section for "Example n" and assuming that the highest number "n" found is the number of examples.

Table 29 contains records containing fields including: patent number, identity of the jurisdiction, assignee, region, sector, beginning date of enforceable term, ending date of enforceable term, and relative value. The patent number and identify of the jurisdiction forms a unique identification for each record in table 29.

Table 30 contains records containing fields including: patent number, identity of the jurisdiction, assignee, region, sector, CF of GDP, CF of net earnings, beginning date of enforceable term; ending date of enforceable term. The patent number and identity of the jurisdiction forms a unique identification for each record in table 30. Table 30 is generated by database queries and functions executed on the data in table 29. The CF of GDP and CF of net earnings are determined by generating a function from the rules in table 25, applying that function on the value characteristics fields in table 29, and either normalizing the sum of the CF of GDP for all patents to the MCF of GDP (GDP data being stored in table 22) or normalizing the CF of net earnings for all patents to the MCF of net corporate earnings (net corporate earnings being stored in table 22), depending upon the economic model implemented.

Preferably, the implemented economic model distinguishes the fraction of GDP and net earnings generated by each sector, in which case the normalization is based upon the fraction of GDP or net corporate earnings for that sector, and the normalization includes only patents associated with that sector as defined by the correspondence of the patent class to the sector in table 26.

Table 31 contains records each including: patent number, identity of the jurisdiction, assignee, region, sector, patent valuation based upon CF of net earnings, patent valuation based upon CF of GDP, beginning date of the enforceable term, ending date of the enforceable term. Moreover, valuations of each patent on a sequence of historical dates may be determined by using the known enforceable term of the patent, the CF of GDP, or CF of net earnings, and assuming an internal rate of return, and the sequence of historical valuations of each patent in association with the date upon which each valuation is based may also be stored in table 31. The patent number and identity of the jurisdiction form a unique identification for each record in table 31.

Table 32 contains records each including: economic sector, the sum of CF of GDP of patents associated with that sector, the sum of CF of net earnings of patents associated with that section, the valuation of the sum of the patents associated with that sector based upon CF of GDP, and based upon CF of net earnings. In addition, the record for each sector in table 32 may contain fields storing the sum of historical values for the number of enforceable patents, the sum of historical values for CF of GDP, the sum of historical values for CF of net earnings, and the sum of historical values for first and second patent valuations (i.e., of GDP and net earnings), and fields storing future extrapolations of each summed quantity based upon values of a fit of a fitting function to the historical data. Each record in table 32 may include fields, or associated tables, containing the name or names of the assignee or assignees, the name or names of the geographic regions of the assignees or of inventors, ranked by the number of patents associated with the sector associated with each assignee or region. The sector forms a unique identification for each record in table 32.

For an example of the historical sector data and extrapolation of that data to future time, assume a sum of CF of net earnings for the pharmaceutical industry showing the following data: (30, 33, 36, 38, 40, 41, 43, 45, 49, 56, 69, 79) where each integer represents net earnings in billions over a one year period, where the data shown is for consecutive one year periods, and where the most recent entry of 79 represent the net earnings in the most recent year. This data is fit to a second order polynomial the best fit for which provides a quadratic function. The value of the quadratic function on the subsequent five years is computed, those values are predictions of the CF of net earnings for pharmaceutical patents for the next five years.

Table 33 contains records each including: geographic region, the sum of CF of GDP of patents associated assignees from each geographic region, the sum of CF of net earnings of patents associated assignees from each region, the sum of CF of GDP of patents associated inventors from each geographic region, the sum of CF of net earnings of patents associated inventors from each region, the sum of each of GDP and net earnings based patent valuations for patents associated with assignees and inventors from the region. In addition, for each region's record, table 33 may contain fields storing the sum of historical values for CF of GDP, sum of CF of net earnings, sum of each of first and second patent valuations, sum of number of patents obtained each year, and sum of number of enforceable patents each year, and fields storing future extrapolations of each summed quantity. Moreover, each record in table 33 may include fields, or associated tables containing each of the names of the assignees and the names of the sectors, ranked by the number of patents associated with each assignee and sector. The geographic region forms a unique identification for each record table 33.

Table 34 contains records containing fields including: assignee name, regions, sector, sum of the number of patents currently enforceable and associated with (i.e., owned by) the assignee, the number of patents obtained in the last year and associated with the assignee, the sum of CF of GDP of patents associated with the assignee, the sum of CF of net earnings of patents associated with the assignee, the sum of patent valuations based upon GDP of patents associated with the assignee, and the sum of patent valuations based upon CF of net earnings of patents associated with the assignee. The fields listed in this paragraph contain present date values.

In addition, table 34 also stores values for quantities for prior and future dates. The record for each assignee in table 34 contains fields storing the sum of the number of patents obtained by the assignee in prior years, the sum of number of the assignee's patents enforceable at a sequence or historical times, the sum of the CF of GDP of the assignee's patents enforceable at a sequence or historical times, and the sum of the CF of net earnings of the assignee's patents enforceable at a sequence of historical times. Values for the sums of the CFs for patents and the number of enforceable patents owned by the assignee on a given historical date are determined by summing the CF values for patents owned by the assignee and determined to be enforceable on that historical date. Enforceability of a patent on a data requires that the patent be within its beginning and ending of enforceable term dates. Enforceability may also depend upon data identifying a patent that was canceled or held invalid on a given date.

In addition, the record for each assignee in table 34 may contain fields storing the sum of the valuation of all patents owned by the assignee with the valuation assessed for a sequence of historical dates. The valuations of each patent on a historical date are provided in table 31.

In addition, for each company's record, table 34 may contain fields storing extrapolated future values for the sum of the number of patents obtained per year by the assignee, the sum of the number of enforceable patents owned by the assignee, the sum of the CF values of GDP for the patents owned by the assignee, the sum of the CF values of net earnings for patents owned by the assignee, the sum of the patent valuations for the patents owned by the assignee. The extrapolated future values stored in table 31 are preferably for each of the subsequent five years. The extrapolations are based upon fitting a function to the trend in the prior values for each one of these quantities (i.e., the sum of each of the number of patents per year, the sum of each of the CF values, and the sum of each of the valuations), and determining the values of each fitting functions at each of the future dates. The values of the fitting functions at the future dates are stored in fields in table 34 in association with the corresponding future date.

In addition, each record in table 34 may include additional fields, or associated tables, containing the names of the geographic regions, and the names of the sectors, ranked by one or more of the sum of the number of patents obtained in the most recent year, the sum of the number of enforceable patents, the sum of each of the CF's or patent valuations associated with each region and sector.

Table 35 contains records for each company. These records each contain several fields storing the HPF, CPF, and FPF ratios, and the HPS, CPS, and FPS values for each company for various dates.

Method of Generating Reports From the Database Tables

Figure 4:
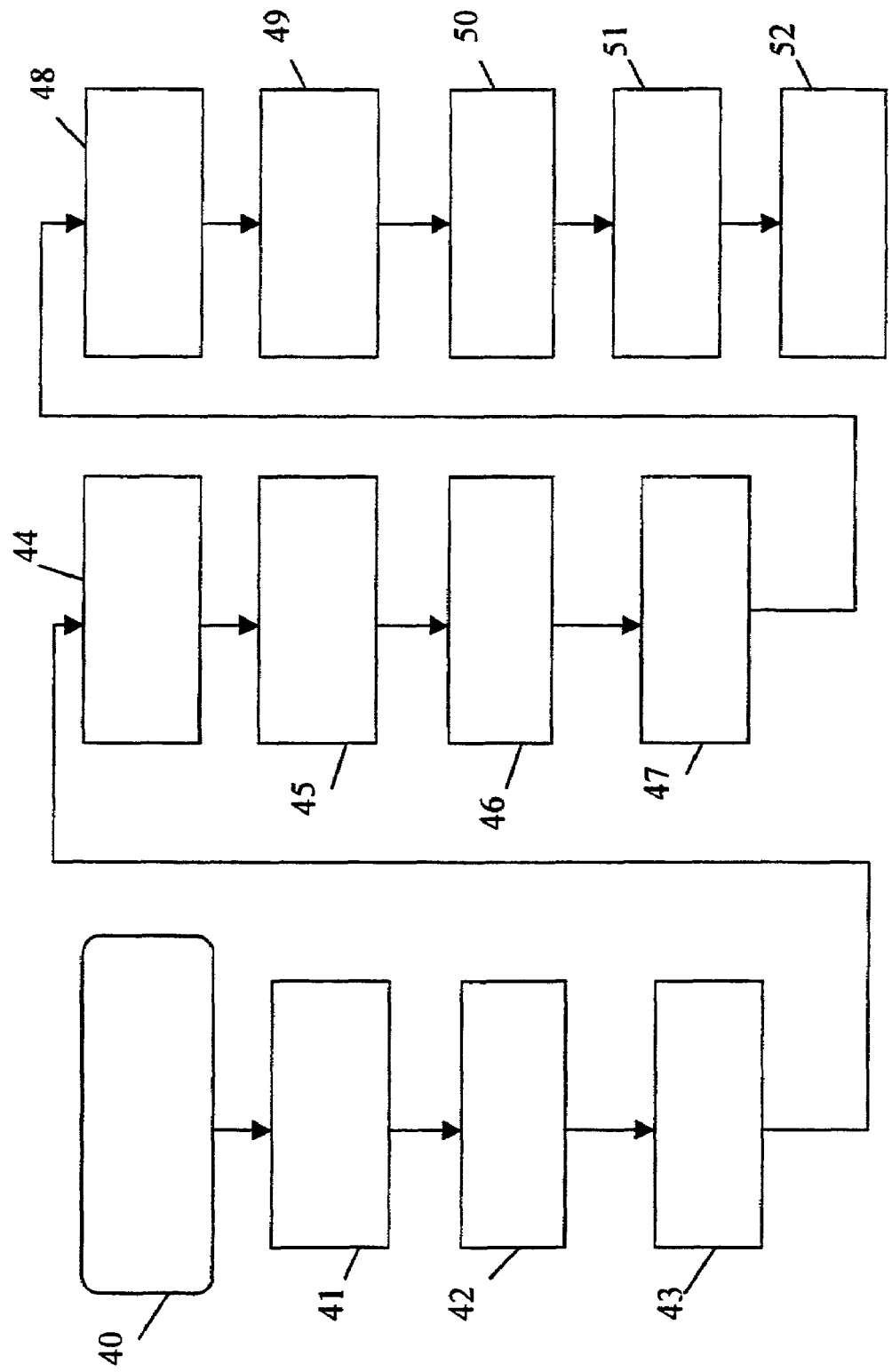
FIG. 4 is a process flow chart showing the novel steps used to generate data in some of the tables in the novel database of FIG. 1.

FIG. 4 shows a flow chart for the steps used to analyze the data in the database 10 of FIG. 1.

In step 40, the database is opened in a database program such as Access 2000 or SQL Server 7.0.

In step 41, an algorithm is run on the contents of the patent data table 20 to derive relative value data including lengths and number of the independent claims, the number of each type of independent claims, the length of the description, and the number of examples. Preferably, the length of the shortest independent claim is determined. The relative value data derived from the patent data in table 20, and the relative value data preexisting in the patent data table 20, for each patent, are stored in table 28 in a record for the corresponding patent.

In step 42, a relative value algorithm is run on the relative value data stored in the record for each patent in table 28 to provide a "relative value number" for that patent. The relative value number for each patent determined using the relative value algorithm is then stored in a record in table 29 for the corresponding patent, each record containing a relative value number for one patent. The relative value algorithm is a function of the relative value data for each patent. Preferably, the relative value algorithm provides a relative value number for each patent depending upon a function, RVf, of the relative value data. Preferably, the function, RVf, is a product or sum of a set of functions, and each member of the set of functions depends only upon one relative value variable. For example, the relative value function, RVf, may be a product of the values of the functions f1 through f23, wherein f1 through f23 represent the anticipated effect on the relative values of patents due to relative value data in a corresponding data field on the values of the patents. Examples of these functions are f1=(1.0/(number of assignees); f2=(1.0+0.2*(NREF−NREFave)/(NREF+NREFave)) where NREF is the number of United States patent references cited and NREFave is an arbitrary number but may be equal to an average of the number of US patent references cited; f3=(1+0.05*(NFREF−NFREFave)/(NFREF+NFREFave)) where NFREF is the number of foreign references cited and NFREFave equals an arbitrary number but may be equal to an average of the number of foreign patent references cited; f4=(1+0.2*(NOREF−OREFave)/(NOREF+NOREFave)) where NOREF is the number of other references cited and NOREFave equals an arbitrary number but may be set equal to an average of the number of other references cited; f5=(1+0.2*(NOC−NOCave)/(NOC+NOCave)) where NOC is the number of claims and NOCave is the average number of claims; f6=(1+1.0*(NIMC−NIMCave)/(NIMC+NIMCave)) where NIMC is the number of independent method claims and NIMCave is an arbitrary number but may be equal to the average of the number of independent method claims; f7=(1+1.0*(NIPC−NIPCave) (NIPC+NIPCave)) where NIPC is the number of independent product claims and NIPCave is an arbitrary number but may be equal to the average of the number of independent product claims; f8=(NCSICave/(NCSIC+10.0)) where NCSIC is the number of characters in the shortest independent claim and NCSICave is an arbitrary number but may be equal to the average of the number of characters in the shortest independent claim; f9=(1+0.2*(NF−NFave/(NF+NFave)) where NF is the number of figures or the highest numeric numbered figure and NFave is an arbitrary number but may be equal to the average number of figures or the average of the highest number figure number; f10=(1+1.0*(NCS−NCSave/(NCS+NCSave)) where NCS is the number of characters in the specification and NCSave is an arbitrary number but may be equal to the average of the number of characters in the shortest independent claim; f11=(1−0.1*delta(FPMF)) where FPMF indicates a lapse in the enforceability of the patent due to a failure to timely pay a maintenance fee; f12=(5.0*DELTA(R1)) where DELTA indicates a delta function and R1 equals one when the patent was reexamined once and zero otherwise; f13=(10.0*DELTA(R2)) where R2 is one if the patent has been reexamined twice and is zero otherwise; f14=(15.0*DELTA(R3)) where R3 is one if the patent has been reexamined thrice and is zero otherwise; f15=(0.95+0.1*DELTA(RTT)) where RTT is one if there is a certificate of correction of the patent; f16=(0.95+2.0*DELTA(NTE1)) where NTE1 indicates that a term extension is provided by 35 USC 154; f17=(0.95+2.0*DELTA(NTE2)) where NTE2 indicates a term extension provided by 35 USC 155; f18=(0.95+2.0*DELTA(NTE3)) where NTE3 indicates a term extension provided by 35 USC 156; f19=(20.0*DELTA(NTE4)) where NTE4 indicates a term extension provided by a special Legislative act applicable retroactively to a class of less than twenty existing patents; f20=(1.0+10*DELTA(NOL)) where NOL indicates that the patent has been involved in litigation; f21=(0.9+1*DELTA(PC)) where PC is one when there is a claim in a PCT, EPC, or Japanese application to any of the US priority application numbers (including the patent's serial number) claimed in the US patent; f22=(0.9+1*DELTA(FPC)) where FPC is one if there is a priority claim in the US patent to a foreign priority application; f23=(10*ELTA(RE)+1.0*DELTA(U)+0.1*DELTA(D)+0.1*DELTA(P)) where RE indicates a reissue patent, U indicates a utility patent, D indicates a design patent or a utility model, and P indicates a plant patent; and f24=AVF indicates a patent value determined by a conventional valuation process.

The important point about each of the functions f1 to f23 is that the functional variation is based upon a logical relationship between the variable or heuristic knowledge of the effect of variation in the variable. For example, it is well known that any assignee may grant a license, and therefore the value of a patent falls off dramatically with the number of assignees. The number of references cited on a patent and the number of claims in the patent are evidence of the value anticipated from the patent and therefore large numbers of cited references and claims indicate a relatively valuable patent. The number of examples and figures in a patent relate to the breadth of the disclosure, and therefore large numbers of figures and examples suggest that the claims are relatively likely to be broad in scope and also sufficiently supported by the specification, and therefore indicate a relatively valuable patent. The breadth of a claim decreases with every limitation added into it. Since limitations are described by recitations, claims consisting of a relatively short recitation are relatively more valuable than long claims. Independent claims are more valuable than dependent claims, because the technology covered by a dependent claim is as a matter of law also covered by the independent claim from which it depends. Moreover, because in most jurisdictions, each independent claim must cover different subject matter from any other independent claim in the same patent, the scope of coverage of a patent increases with the number of independent claims, and therefore the relative value of a patent increases with the number of independent claims.

Alternatively, the RVf may also be a function of the USPCS or IPCS code, thereby reflecting at least in part in the relative value number the difference in value do to different economic sectors.

In step 43, if the implemented economic model contains sector dependence, the sector to which each patent is associated is determined using the current class data contained in table 21 and the sector to class correspondence contained in table 26. The sector to which each patent is associated is stored in a record for the patent in table 29. If the implemented model has no sector dependence, this step is skipped.

In step 44, an algorithm based upon the term rules data stored in the patent term rules table 24, and depending upon the term relevant data (e.g., priority date, filing date, issued date, and terminal disclaimer date) contained in the patent data table 20, is performed for each patent to determine the beginning and ending dates of the enforceable term of each patent. The beginning and ending dates of the enforceable term for each patent are stored in table 29 in the record for the corresponding patent.

In step 45, the CFs for each patent are determined based upon the economic sector data stored in table 22, the relative value number stored in table 29, and the patent's sector stored in table 29. The determined CF values, the beginning and ending dates of the enforceable term, the sector data, the sector average profit margin, the assignee name, the geographic region of the inventors, and the geographic region of the assignees, are stored in table 30.

In step 46, each patent is valued based upon its CF of net earnings, enforceable life, and a predetermined internal rate of return. In addition, in step 46, each patent is valued based upon its CF of GDP, a profit margin for the sector with which the patent is associated, and a predetermined internal rate of return. The patent valuations are stored in table 31.

As an alternative, the computer system 8 implementing the inventions may make the profit margins and internal rates of return user selectable e.g., by entering data into a form on a web page, and may allow calculation involving multiple patents to set the value for some of the patents (e.g., based upon conventional valuations)

In step 47, the patents are sorted and analyzed by sector. For each sector, the patents within their enforceable term for a sequence of historical dates (e.g., the historical dates may be the first of each year for the last 20 years) are determined, and the CF of GDP for those patents are summed, and the CF of net earnings for those patents is summed. The sequence of CF values for GDP (as well as the CF of net earnings) provides a trend in patent value in each economic sector. The trend can be fit by a function and the function extrapolated to show anticipated future CF values for that sector. The sequences of CF values and the fitting function's parameters or selected values from the fitting function for each sector are stored in table 32.

In step 48, the patents are sorted and analyzed by geographic region. It is to be understood that the sorting may be by the address of one or more of the inventors or assignees, and that geographic region may be identified by country, state, region, city, or cross references using an appropriate lookup table to approximate longitude and latitude. For each such geographic region, the patents within their enforceable term on a sequence of historical dates (e.g., the first of each year for the last 20 years) are determined, and the CF of GDP for those patents are summed, and the CF of net earnings for those patents is summed. The sequence of CF values for GDP (as well as the CF of net earnings) provides a trend in patent value in each geographic region. The trend can be fit by a function and the function extrapolated to show anticipated future CF values for that sector. The sequences of CF values and the fitting function's parameters or selected values from the fitting function for each geographic region are stored in table 33.

In step 49, the patents are sorted and analyzed by assignee name or company name. It is to be understood that different assignee names that correspond to the same legal entity may be associated with one another and analyzed as one entity. For example, patents assigned to an assignee that is known to be a wholly owned subsidiary of a parent company may be associated with the parent company's company name via the assignee name to company name correspondence table 27.

In step 49, the patents within their enforceable term for a sequence of historical dates (e.g., the first of each year for the last 20 years) that are owned by an assignee or company are determined, the CF of GDP for those patents is summed, and the CF of net earnings for those patents is summed. The sequence of summed CF values for GDP (as well as the CF of net earnings) provides a trend in patent value for patents owned by the assignee or company. The trend can be fit by a function and the function extrapolated to show anticipated future CF values for that assignee or company. The sequences of CF values and the fitting function's parameters provides a trend in patent value for patents owned by the assignee or company.

In addition, in step 49, the number of patents issued or obtained through purchase (i.e., acquired) by the assignee or company versus time may be determined, that data fit by a fitting function, and the fitting function extrapolated to future time to predict the number of patents the company will obtain in future times. In addition, the number of enforceable patents versus time that are owned by the company may be determined, fit by a fitting function, and the fitting function extrapolated to future time to predict the number of enforceable patents the company will own at future times.

In addition, in step 49, the sum of the patent valuations for patents owned by the assignee or company is determined. Furthermore, in step 49, patent valuations on a sequence of historical dates may be determined for each patent owned by the assignee or company. The historical patent valuations for a patent may be determined using the known enforceable term of the patent, the current valuation of the patent, and assuming an internal rate of return. Alternatively, the historical valuations may be determined using any of the CFs for the patent and the conventional valuation formula cited above. The sum of the values on a sequence of historical dates of all patents then owned by the assignee or company provides a trend in the total value of the assignee or company's patents. That trend can be fit to a function, and the function extrapolated into the future to estimate the value of the company's patent portfolio in the future.

Thus, in step 49, the historical, present, and future values of patent dependent quantities as well as the fitting functions' fit parameters may be stored in table 34.

Alternatively to steps 47-49, the sums of CF of GDP, CF of net earnings, historical patent valuations (as described in step 49) for patents enforceable on a sequence of historical dates, number of patents issued per time, and number of enforceable patents per time associated with any combination of sectors, geographic regions, and assignees may be determined. The data for each trend in these summed quantities versus time may be fit to a fitting function, and that function extrapolated to future times as discussed for steps 47-49. This type of analysis may provide a quantitative indication of the economic activity of a particular company in a particular geographic region (for example, a country) for a particular area of technology, or of an economic sector in a particular geographic region. That type of knowledge could be used, for example, by another company in deciding where in the world and whether to set up a manufacturing plant in the same area of technology and where to sell goods in that area of technology. That type of knowledge may also be used by investors to target which areas of the world in which to invest in a selected technology, and in which company in a particular country to invest in that technology.

In addition to steps 47-49, the sum of the patent valuation for patents broken down by sector, geographic region, and assignee may be determined and stored e.g. in tables 32-34.

In step 50, the patent data and analysis provided for a company in any of step 49 is combined to provide financial indicators for that company. In step 50, the data in table 35 is generated by determining the HPF, CPF, and FPF ratios, and the HPS, CPS, and FPS ratios for each company. These ratios are generated by dividing each one of the temporal sequence of values for each company's patent portfolio stored in table 34 by a sequence of values stored in table 23 for corresponding times and of financial indicators for the same company.

In step 51, the data record for each assignee or company stored in table 34 is read by a routine that generates a file containing an identification of the assignee or company by name and graphs plotting the patent values versus time along with comparisons of sector averages. Each file is stored for retrieval upon a query by a user, such as the user of the client computer 3.

In step 52, the data record for each assignee or company stored in table 35 is read by a routine that generates a file containing an identification of the assignee or company by name and graphs plotting the patent values versus time along with comparisons of sector averages and the HPF, CPF, FPF, HPS, CPS, and FPS ratios. Each file is stored for retrieval upon a query by a user, such as the user of the client computer 3.

Similar steps provide files storing reports on sectors and geographic regions. In addition, the users of the system of the invention can query the database for patent valuations stored in table 31 and CF values stored in table 30.

As an alternative to steps 51 and 52, the system may be configured so that a report is generated in response to a user's query, instead of as part of a batch routine prior to a user's query.

EXAMPLE OF THE INVENTION

An example is provided for data for the company Marsh-McBirney, Inc. Marsh-McBirney, Inc. is the assignee of thirteen United States patents. Data corresponding to the thirteen patent records in database table 28 for this assignee is shown below in comma delimited format. Each record contains the following fields: Primary key, patent number, issued date, earliest US priority date, filing date, inventor address, assignee name, assignee address, application filing date, primary USPCS, primary IPS, number of claims, number of independent method claims, number of independent non-method claims, length in characters of the shortest independent claim, length in characters of the description, and number of figures.

1, "U.S. Pat. No. 5,811,688", Sep. 22, 1998, Jan. 18, 1996, Jan. 22, 1997, "Buckeystown, MD", "Marsh-McBirney, Inc.", "Frederick, Md.", "73/861.25", "G01F 001/66", 47,1,1,461,30867,24

2, "U.S. Pat. No. 5,684,250", Nov. 4, 1997, Aug. 21, 1995, Aug. 21, 1995, "Buckeystown, MD", "Marsh-McBirney, Inc.", "Frederick, Md.", "73/227", "G01F 001/00", 15,1,1, 642,25697,18

3, "U.S. Pat. No. 5,644,088", Jul. 1, 1997, Jul. 27, 1995, Jul. 27, 1995, "Purcellville, VA", "Marsh-McBirney, Inc.", "Frederick, Md.", "73/756", "G01F 023/18", 17,0,1,972,14219,3

4, "U.S. Pat. No. 5,594,179", Jan. 14, 1997, Nov. 6, 1995, Nov. 6, 1995, "Buckeystown, MD", "Marsh-McBirney, Inc.", "Frederick, Md.", "73/861.07", "G01F 001/708", 16,1,1,574, 15937,2

5, "U.S. Pat. No. 5,544,531", Aug. 13, 1996, Jan. 9, 1995, Jan. 9, 1995, "Purcellville, VA", "Marsh-McBirney, Inc.", "Frederick, Md.", "73/861.01", "G01F 015/02", 13,1,1,1039, 15805,7

6, "U.S. Pat. No. 5,421,211", Jun. 6, 1995, Nov. 6,1994, Nov. 6, 1994, "Purcellville, VA", "Marsh-McBirney, Inc.", "Frederick, Md.", "73/861.25", "G01F 001/00", 8,1,1,1220, 23162,12

7, "U.S. Pat. No. 5,398,552", Mar. 21, 1995, Nov. 26, 1993, Nov. 26, 1993, "Buckeystown, MD", "Marsh-McBirney, Inc.", "Frederick, Md.", "73/861.12", "G01F 001/00", 10,0, 1,1399,15110,10

8, "U.S. Pat. No. 5,385,056", Jan. 31, 1995, Jan. 2, 1992, Jan. 19, 1994, "Buckeystown, MD", "Marsh-McBirney, Inc.", "Frederick, Md.", "73/861", "G01F 003/38", 4,0,1,1897,44859,13

9, "U.S. Pat. No. 5,263,374", Nov. 23, 1993, Jan. 24, 1992, Jan. 24, 1992, "Buckeystown, MD", "Marsh-McBirney, Inc.", "Frederick, Md.", "73/861.15", "G01F 001/00", 17,0, 1,1170,22788,26

10, "U.S. Pat. No. 4,549,434", Nov. 29, 1985, Nov. 26, 1984, Nov. 26, 1984, "Silver Spring, MD", "Marsh-McBirney, Inc.", "Gaithersburg, Md.", "73/299", "G01F 023/14", 12,0,1,1180,13348,6

11, "U.S. Pat. No. 4,459,858", Jul. 17, 1984, Jun. 1, 1983, Jun. 1, 1983, "Silver Spring, MD", "Marsh-McBirney, Inc.", "Gaithersburg, Md.", "73/861.12", "G01F 001/58", 17,0,1, 1241,24898,8

12,"U.S. Pat. No. 4,083,246", Apr. 11, 1978, Feb. 28, 1977, Feb. 28, 1977, "Silver Spring, MD", "Marsh-McBirney, Inc.", "Gaithersburg, Md.", "73/227", "G01F 001/00", 18,0, 1,773,26880,17

13, "U.S. Pat. No. 4,015,471", Apr. 5, 1977, Nov. 18, 1975, Nov. 18, 1975, "Silver Spring, MD", "Marsh-McBirney, Inc.", "Rockville, Md.", "73/194EM", "G01F 001/58", 5,0,2, 1047,14966,7

As per step 42, a relative value number for each patent is determined. For simplicity of explanation, the relative value number is set equal to the function $RFf = f1 * f2$ where $f1 = (500/\text{length of shortest independent claim})$ and $f2 = (\text{number of independent claims})$. For patents 1-13 of the example, f1=1.08, 0.78, 1.94, 0.87, 0.48, 0.41, 0.36, 0.26, 0.43, 0.42, 0.40, 0.65, 0.48 and f2=1.41, 1.41, 1, 1.41, 1.41, 1.41, 1, 1, 1, 1, 1, 1, 1.41 and therefore RFf for patents 1-13 of the example are: 1.5, 1.1, 1.9, 1.2, 0.68, 0.58, 0.36, 0.26, 0.43, 0.42, 0.40, 0.65, 0.68. These values are stored in table 29.

As per step 43, the USPCS classifications for the 13 patents are correlated with the sector. In this example the economic model employs no sector dependence. Therefore, MED of MEIs and MCFs for the entire economy are used.

As per step 44, the term of patents 1-13 are determined and stored in table 29. The first five patents of the example were filed after Jun. 7, 1995 and therefore have a term of 20 years from their domestic priority. The sixth through thirteenth patents issued from applications filed prior to Jun. 8, 1995 and therefore have terms of 17 years from their respective issue dates. The determined patent term data entered into a table corresponding patent records in table 29. The determined terms for patents 1-13 are: Sep. 22, 1998-Jan. 18, 2016; Nov. 4, 1997-Aug. 21, 2015; Jul. 1, 1997-Jul. 27, 2015; Jan. 14, 1997-Nov. 6,2-15; Aug. 13, 1996-Jan. 9, 2015; Jun. 6, 1995-Jun. 6, 2012; Mar. 21, 1995-Mar. 21, 2013; Jan. 31, 1995-Jan. 31, 2013; Nov. 23, 1993-Nov. 23, 2010; Oct. 29, 1985-Oct. 29, 1002; Jul. 17, 1984-Jul. 17, 1999; Apr. 11, 1978-Apr. 11, 1995; Apr. 5, 1977-Apr. 5, 1994.

As per step 45, the CFs of patents 1-13 are determined and stored in table 30. The economic model sets the MCF of GDP to the value of GDP and the MCF of net corporate earnings to the value of net corporate earnings. That is, the economic model assumes that all economic activity is cover by patent rights. The number of enforceable patents is estimated to be the number of utility patents issued in the last 17 years, which is 6040000-4360000, plus the number of plant patents issued in the last 14 years, which is 10,700-5,600, plus the number of design patents issued in the last 14 years, which is 404,000-282,000, which equals 1,807,000 enforceable patents. The GDP for (1997 figures) for the entire United States economy is 8083 billion dollars per year. The net corporate income (1995 figures obtained from IRS data) was 880 billion dollars per year. The average GDP value per patent is 8083 billion dollars per year divided by 1,807,000 enforceable patents, is about 4.5 million dollars per year, and is the average patent value. For simplicity for this example, assume that the sum of the relative value numbers for the 1,807,000 enforceable patents equals 1,807,000, so that the CF of GDP of each enforceable patent is 4.5 million dollars per year times the patent's relative value number. For Marsh-McBirney, Inc.'s thirteen patents, this provides CF of GDPs in millions of 4.5 million dollars per year times each of 1.5, 1.1, 1.9, 1.2, 0.68, 0.58, 0.36, 0.26, 0.43, 0.42, 0.40, 0.65, 0.68, which is: 6.7, 4.9, 8.5, 5.4, 3.1, 2.6, 1.6, 1.2, 1.9, 1.9, 1.8, 2.9, 3.1 millions of dollars per year for patents 1-13 respectively. Similarly, the average CF of net earnings is 880 billion dollars per year divided by 1,807,000, which is 0.487 million dollars per year. Therefore, the CF of net earnings for each patent is its relative value number times 0.487,000 dollars per year, or: 0.73, 0.53, 0.92, 0.58, 0.33, 0.30, 0.17, 0.12, 0.21, 0.20, 0.19, 0.32, 0.33 millions of dollars per year. The sum of Marsh-McBirney, Inc.'s CF of GDP of its enforceable patents on the first day of 1990 are the sum of patent records 13-10, or 9.7 million dollars per year. Similarly, the sum in millions per year of Marsh-McBimey, Inc.'s CF of GDP of its enforceable patents on the first day of each of years 1990-2000 is: 9.7, 9.7, 9.7, 9.7, 11.6, 8.5, 11.0, 14.1, 32.9, 39.6, 37.8. The sum in millions per year of Marsh-McBimey, Inc.'s CF of net earnings of its enforceable patents on the first day of each of years 1990-2000 is: 1.04, 1.04, 1.04, 1.04, 1.25, 0.92, 1.39, 1.72, 3.75, 4.48, 4.15. The number of enforceable patents owned by Marsh-McBimey, Inc. on the first of each of years 1990-2000 are: 4, 4, 4, 4, 5, 4, 6, 7, 10, 11, 10.

Figure 5:
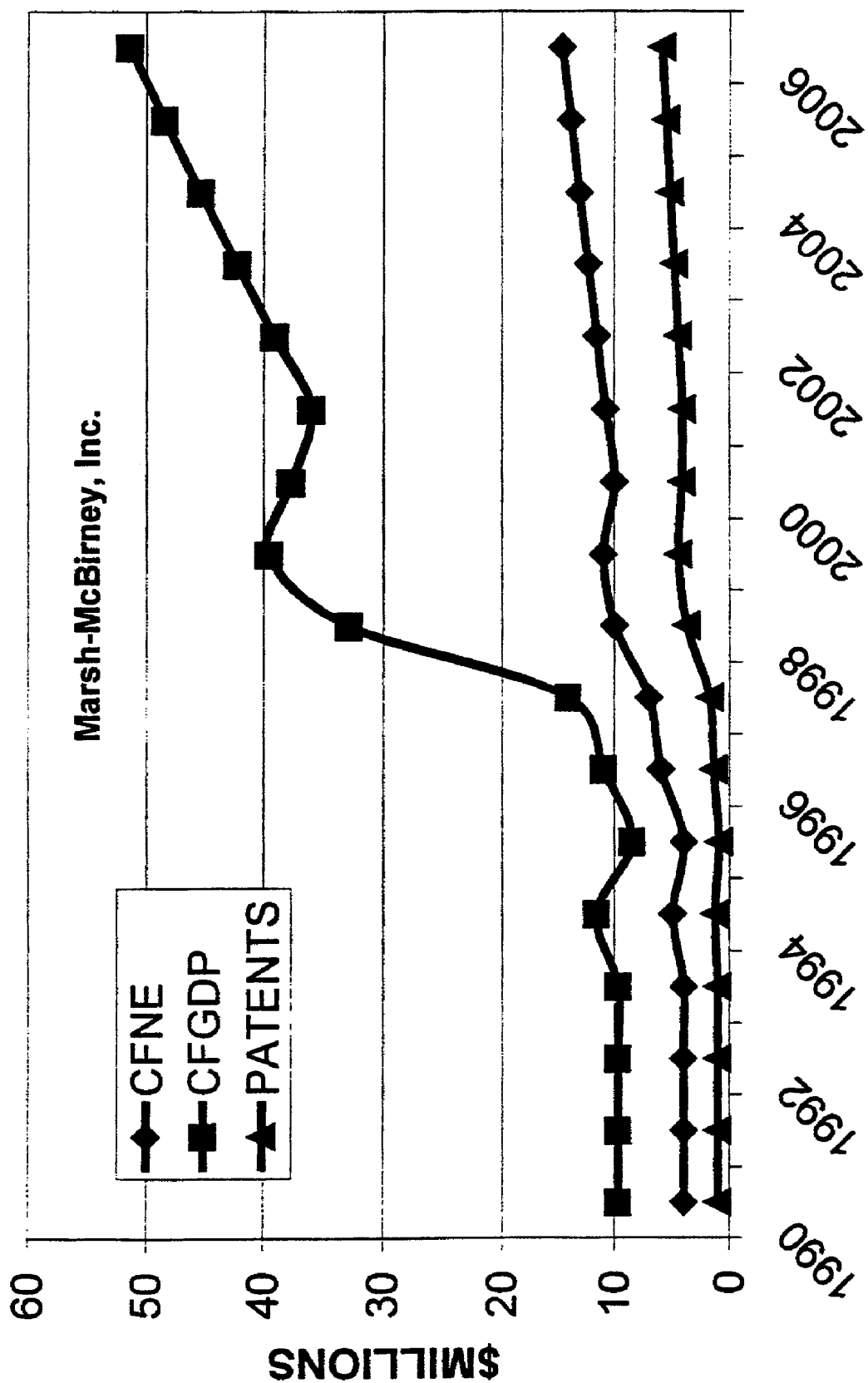
FIG. 5 is a schematic of a printout of a patent data report generated by the system of the invention.

FIG. 5 is a graphic report showing the sum of the number of enforceable patents, CF of net earnings, and CF of GDP for Marsh-McBimey, Inc., including extrapolations to 2006.

Assume that Marsh-McBimey, Inc. is a publicly traded company having the following financial data (this data is fictitious and is merely being presented to show aspects of the invention): market capitalization constant at $20 million and a common stock price constant at $10 on the first of each of years 1999-2000, and a net earnings also constant at $2 million per year. The PF and PS ratios can be calculated for the 1990 to 2000 time period and extrapolated to future time.

Figure 6:
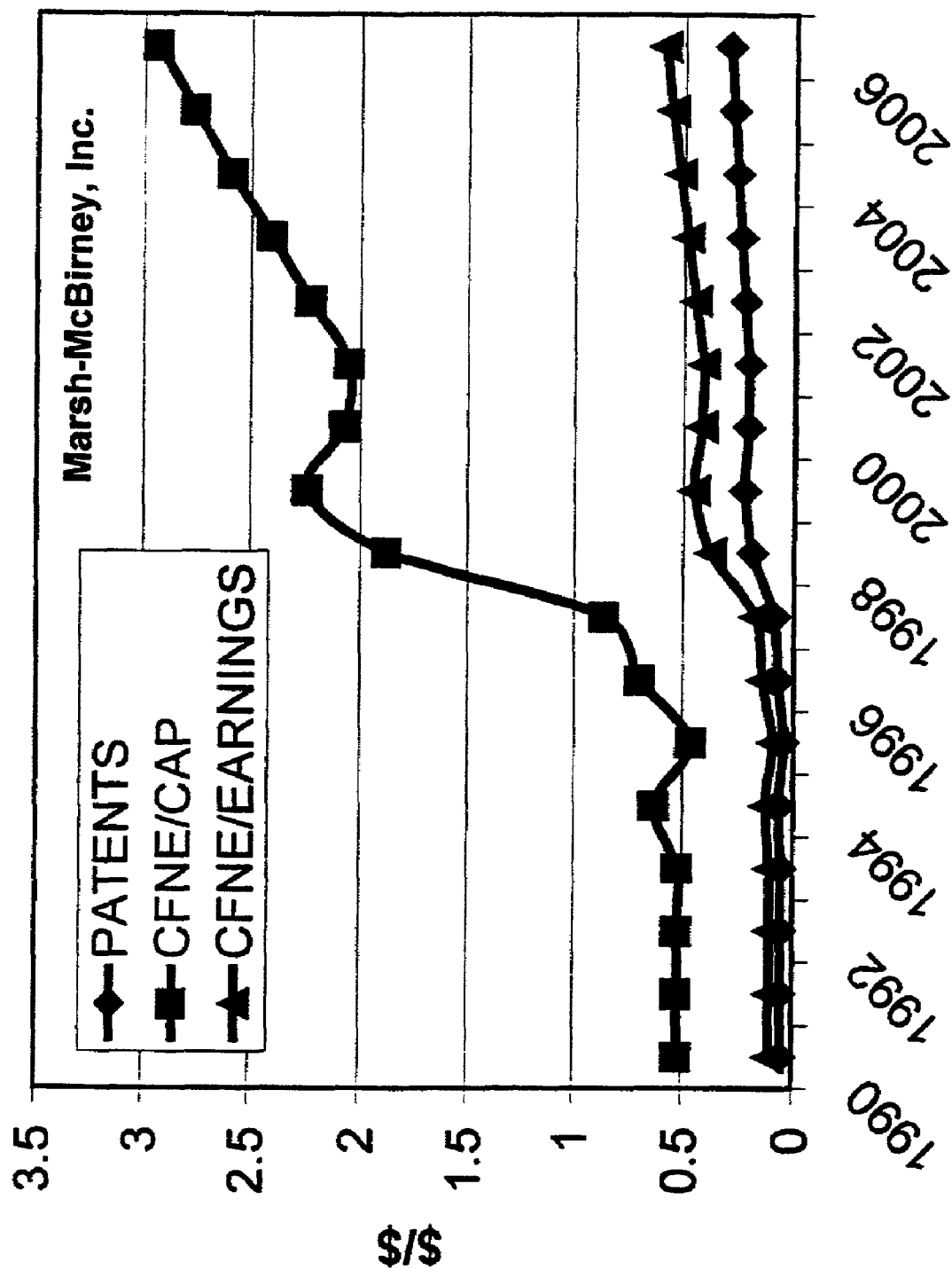
FIG. 6 is a schematic of a printout of a combined financial and patent data report of the invention.

FIG. 6 is a graphic report showing the PF ratios for Marsh-McBimey, Inc. of CF of net earnings to market capitalization, actual annual net earnings, and the PS ratio of CF of net earnings to stock price versus time.

Marsh-McBimey, Inc.'s patent valuation may be determined using the formula:

$$Vtot = \Sigma_k V_k = \Sigma_k (\Sigma_m CFN_m/(1+R)^m) + \Delta_k.$$

The summation over k is from k=1 to 13 for the thirteen patents owned by this company. The summation over m for the kth patent is from m=1 to n where n is defined as the highest integer value of years to the end of term date minus the current date, n representing whole years over which the patent is enforceable. $CFN_m$ is the CF of net earnings for the mth patent. $\Delta_k$ represents the current value of the kth patent in for the partial last year of enforceable term, and $$\Delta_k = CFN_m/(1+R)^{n+1} * \Delta Y.$$

$\Delta Y$ is the fraction of the last year that the patent is enforceable.

Assume the current date is Jan. 1, 2000. Assume an internal rate of return R of fourteen percent. The first patent has CF of net earnings of 0.73 million per year, and it expires on Jan. 18, 2016. Therefore, n=16 and $\Delta Y=(18-1)/364=0.046$ for the first patent. Calculating the $V_k$ provides values on Jan. 1, 2000 in millions of dollars for patents 1-13 of 4.29, 3.06, 5.32, 3.37, 1.88, 1.59, 0.93, 0.64, 1.04, 1.76, 0, 0, 0. On Jan. 1, 200 this provides Vtot=$28.8 million. The historical time dependence of Vtot can be determined by setting the current date used to define n to historical dates. The Vtot as a function of historical date calculated this way may be used to extrapolate the Vtot to future dates.

The general increase versus time of the patent indicators in FIG. 5 and the ratio of patent to financial indicators in FIG. 6 indicate that Marsh-McBirney, Inc. patent protection versus time is increasing on an absolute scale (FIG. 5) and relative to the company's perceived net worth (FIG. 6) indicating that the company may be undervalued.

Determining Assignee Names from an Assignee Name in a Run-on String Field

Electronic copies of the assignment records from the USPTO available on the Patents ASSIGN CD-ROM database sold by the USPTO contain a single field including some or all of the assignee name, the address for the assignee, the form of entity of the assignee, and the state of entity organization data, and the data from that field is hereinafter referred to as "the run-on string." Moreover, there is no data normalization of state names, state abbreviations, state codes, references to streets, or other data elements in the run-on string. There is a very high degree of data error particularly in the form of misspellings. This degree of format inconsistency and spelling errors is typical of hand transcribed name and address data fields. Therefore, the algorithms described below for automatically determining the names and other information (e.g., street and city address, state of incorporation, state of business) for artificial legal entities, from electronically stored are believed to have wide applicability in cleaning up company name and address lists.

The algorithm described herein runs on the computer system 8 and parses the run-on string into separate values for assignee name, U.S. state of place of business, foreign state of place of business, U.S. state of entity organization, and foreign state of entity organization, and ultimately translates the values for states into normalized two letter state codes. The parsing is accomplished by applying several rules applied in combination with databases containing large numbers of data determined by observation to be normal data, variations of normal data, regular data, irregular data, erroneous data, anomalous data, and unique data that occur in the run-on string. These errors in data include misspelled words, improperly placed format characters, such as periods and commas, and words concatenated together. These rules are described below.

First, the assignee name is determined from the run-on string of characters as follows. The run-on string is searched for occurrences of one or more among hundreds of predetermined suffix substrings known to define the end of a name of a corporation or other artificial legal entity. For example, the suffixes "& COMPANY, LTD", "Inc.", and "Co." are suffixes which each indicate the end of the name of an artificial legal entity. Hereafter these substrings are referred to as "suffix flags." Suffix flags indicate an ending portion of an assignee name. A database of predetermined suffix flags is maintained in data storage. Records are easily added to the database if new suffix flags are determined.

Many of the run-on strings contain more than one suffix flag. Certain shorter suffix flags occur within certain longer suffix flags. For example, "COMPANY" occurs within "& COMPANY, LTD." In addition, suffix flags can occur in parts of the run-on string that do not form part of an assignee name, e.g., "CO" may mean Colorado instead of Company. Therefore, the occurrence of any one suffix flag only ambiguously indicates where the assignee name ends. However, suffix flags define character strings that do not exist prior to the end of the name of an artificial legal entity. Therefore the suffix flag, if any, that is closest to the beginning of the run-on string is determined to define the end portion of the assignee name.

During parsing, the database of suffix flags is maintained in an array sorted on their lengths from longest to shortest, to facilitate searching the run-on string for longest suffix flags prior to searching the run-on string for shorter suffix flags. The first suffix flag in the suffix flag array is compared to the characters in the run-on string to see if matches exist. If the first suffix flag is found in the run-on string, its location in the run-on string and the suffix are stored, and the algorithm searches for the next suffix flag in the suffix flag array in the run-on string. If a the second suffix flag is found in the run-on string, the locations in the run-on string and the matching suffix are stored. This process continues until either a predetermined number of matches have been identified, for example five matches, or until all suffix flags in the suffix flag array have been compared to the run-on string. The suffix flag closest to the beginning of the run-on string is determined to be the end portion of the assignee name.

The order of words and parts of phrases in Japanese assignee names is sometimes different that in English assignee names. Specifically, text strings indicating that an assignee is a Japanese corporation may appear at the beginning, middle, or end of the assignee name. For example, the text "KABUSHIKI KAISHA" indicates that an assignee is a Japanese company and this text may appear anywhere in the name of a Japanese company. Special rules are applied to run-on strings containing these special text strings. When a special text string exists in the run-on string and a suffix flag also exists in the run-on string after the special text string, the suffix flag is determined to be the end portion of the assignee name. For example, the name ""KABUSHIKI KAISHA TOYODA LTD." at the beginning of a run-on string would be determined to be the assignee name. If the special text string exists in the run-on string, is not at the very beginning of the run-on string, and is not followed by a suffix flag, the special text string is defined to be the end of the assignee name. If the special text string is at the very beginning of the run-on string, it is ignored.

If no suffix flag occurs in a run-on string, and if no assignee name has been determined using the special text rules for Japanese assignees, the assignee name is determined according to fallback rules.

The first fallback rule determines the assignee name to end immediately prior to either the first comma, semicolon, numeral, or opening parenthesis or blank line space followed by the first comma, semicolon, numeral, or opening parenthesis or blank line.

The second fallback rule determines the assignee name to end immediately prior to a "trailing flag." A trailing flag is a string that has been predetermined to follow trail immediately after an assignee name in a run-on string. The computer system 8 searches the run-on string for matches to many thousands of predetermined trailing flags. An example of a trailing flag is "A CORP OF DE". A database of predetermined trailing flags is maintained in data storage. Records are easily added to this database when new trailing flags are determined.

Certain shorter trailing flags occur within certain longer trailing flags. During parsing, the trailing flags are maintained in a database in an array sorted on their lengths from longest trailing flag to shortest trailing. This sorting supports searching for longer trailing flags first. The trailing flags database also includes a column associating a normalized, two-letter state code with trailing flag indicating the corresponding state (e.g., a trailing flag like "A CORP. OF DE" indicating incorporation in the state of Delaware). The trailing flag column and the state code column together comprise a translation table that allows a trailing flag to be translated into a normalized value for state of entity organization. If a trailing flag is found in the run-on string, the translation is performed to define a normalized state code, and the location of the trailing flag within the run-on string is stored for use in subsequent stages of parsing values from the run-on string.

Determining Additional Data from the Assignee Name in the Run-on String Field

Additional data can optionally be determined from the Patents ASSIGN CD-ROM database. Having previously determined the assignee name and the location of the trailing flag if one occurs, the run-on string can henceforth be viewed as having four regular parts: NAME-MIDDLE-TRAILING FLAG-TRAILER. The run-on strings do not all have this form. Assuming this form allows parsing from it additional data. The run-on string is divided into as many of these four parts as actually occur after defining the assignee name and location of the trailing flag if one has been determined.

Next, the state of place of business is determined. The divided regular parts of the run-on string and the "Correspondence Address" field from the Patents ASSIGN CD-ROM database are searched in a particular sequence for occurrence of one among thousands of substrings that indicate a state of the U.S. or a foreign country. A database of observed phrases and expressions indicating states and countries is maintained in data storage. Records are easily added to the database when new phrases and expressions that indicate states and countries are observed. Certain shorter observed phrases and expressions indicating states and countries occur within certain longer observed phrases and expressions. During parsing, the state code phrases and expressions are maintained in an array sorted on their lengths from longest to shortest. This sorting supports searching for longer phrases and expressions prior to searching for shorter phrases and expressions. The database also includes a column associating a normalized, two-letter state code with each phrase or expression, and another column indicating whether the state code is for a U.S. state or a foreign country. The phrase or expression column, the state code column, and the U.S. or foreign code column together comprise a translation table that allows a phrase or expression to be translated into a normalized, two-letter value for state of place of business.

The algorithm searches the parts in the following order: the MIDDLE, the TRAILER, the "Correspondence Address" field from the Patents ASSIGN CD-ROM database, and the TRAILING FLAG. When a phrase or expression in the database is found, the translation is performed. Searching the MIDDLE, TRAILER, "Correspondence Address" field, and TRAILING FLAG in that order provides the highest confidence that what is found does indicate the state of place of business. For example, a state that occurs in a TRAILING FLAG is more likely to be a state of entity organization than a state of place of business, and therefore it is searched last.

Whenever no state of entity organization is found, a dummy value is used in place of the state of entity organization. Whenever no state of place of business is found, a dummy value is used in place of a state of place of business. Example records in suffix flag, trailing flag, and state code databases are "A CORP. OF N.Y" for a trailing flag, "& CO., LTD" for a suffix flag, "DC" for a state code for the District of Columbia.

Alternatively, street and city address may be assumed to be contained in the text follow immediately after the assignee name and terminating prior to the trailing flag. A database of observed phrases and expressions indicating street addresses and cities is maintained in data storage. Records are easily added to the database when new phrases and expressions that indicate street addresses and cites are observed. Certain shorter phrases and expressions occur within certain longer ones. During parsing, the city phrases and expressions are maintained in an array sorted on their lengths from longest to shortest, and the street address phrases and expressions are maintained in an array sorted on their lengths from longest to shortest. This supports searching for longer phrases and expressions first. The form "street address" followed by "city name" is assumed, and records containing that sequence (allowing for intermediate trivial phrases such "of" "from" "for", etc) are determined to be the street address and city of the assignee.

Deriving Patent Data On a Per Company Basis

In an alternate embodiment, the invention provides a computer system without a substantially complete database of patents locally networked to it. Instead, the computer system 8 may respond to a user's query for patent and financial data analysis on a company by running a script that searches another preexisting non-local online database, such as the patent database of the USPTO, retrieves and analyzes the relevant patent information from patents assigned to that company, analyzes that information to determine the patent value information, and to combine that information with the company financial information in the manner described above to provide useful valuation and investment information to the user. In this embodiment, the number of enforceable patent or enforceable patents in each sector is indeterminate. Therefore, this system may store predetermined or estimated values for the number of enforceable patents or the number of enforceable patents per sector to enable a CF calculation assuming the relative patent value number is one for each patent. Alternatively, this system may store predetermined $C_i$ or estimates of the $C_i$ values and the number of patents per sector in order to facilitate a value determination as a function of the relative value numbers for the patents owned by the company.

Stand Alone Computer Implementation

Any of the alternatives of computer system 8 may alternatively be implemented on a stand alone digital computer system.

Organization Name Determination and Feedback Algorithm

Often people do not know the exact assignee name for a company, but know one word in that name. For example, many people know the name Cisco. However, that is the trade name of the company Cisco Technology Inc. Accordingly, one feature of the invention presents to the user the assignee names retrieved containing one word in the assignee name, such as "Cisco," and lets the user determine which of the names retrieved, such as Cisco Technology Ltd and/or Cisco Corporation, to include in the patent based analysis, and then provides the patent based analysis to the user. This has the additional advantage of allowing the user to determine which companies patents' to pool so that the user can see the effects, for example, of a merger of those two companies, or because the user knows that the two assignees are controlled by the same entity.

Estimating the Number of Patents to Issue to an Assignee Based Upon the Number of Published Applications Europe and Japan and shortly the United States all publish applications eighteen months after their Paris convention date. Published patent applications identify the patent owner. Data indicating the number of patent applications owned by a company can be used in the service of this invention to estimate the number of patents that will issue to the company. The estimate of the number of patents that will issue to a company can be based upon the known average pendency of all patent applications (that number is known ad publically available in at least the United States, the EPC, and Japan), can also be based upon a calculation of the average pendency of the specific company's prior applications or the average pendency of the applications for patents in the sector of the economy associated with the company, and by determining distribution functions or standard deviations for those quantities.

Voluntary Company Input into Patent Database

Further, the computer system 8 may include software that accepts data on pending patent applications electronically submitted by a representative of a company, preferably the company owning the application and make certain data on the application and contingent valuations of the application available to the users. Companies would be motivated to provide the information in order to improve their perceived value in the financial markets and in order to increase their ability to raise capital. Data on patent applications received from companies could be used to estimate the CF and patent values specified herein.

Functionality Related to the User Database

An additional feature of the computer system 8 is the ability to assign accounts to users by providing a user ID, a password, and to account for user payment. The user database of the computer system 8 may provide additional novel functionality to the identified user.

The computer system 8 and the user database 8 may include additional software providing means to accept instructions from the user to store for the user's retrieval the results of the analysis for selected companies, or to transmit that data to another URL or an email address in response to the user's request, or to automatically transmit that information when the data becomes available or at predetermined times, such as midnight each day or a time selected by the user.

Interaction with Financial and Trading Networks

In another embodiment, the computer system 8 includes means to receive from a user financial information for each company or market sector (e.g., financial information being a company's market capitalization, earnings, number of shares outstanding, share price, earnings per share, profit margin, market sector capitalization, earnings, estimated growth rate), and transmit to the user calculated combined PF and PS indicators based upon that information, and combined patent and financial averages for the market sector.

Automatic Data Transmission to Stock Trading Programs

The computer system 8 may include means to automatically send instructions to automated stock trading programs (programmed trading) based upon the existence of conditions depending upon patent data, preferably depending upon both patent and financial data, such as the patent and financial indicators discussed above, for example a PF or PS ratio above or below a certain value, or a PF or PS ratio above or below a function of a sector average. Of course, the system could also be programmed to send patent data or the data resulting from patent analysis to a trading program at a remote site instead, so that the trading program at the remote site could incorporate that data into its buy or sell decision making process and issue buy or sell instructions or advise accordingly.

Predetermined Preprogrammed Transmissions of Selected Analysis Data

The computer system 8 may also include means to be instructed to periodically or upon request send company patent and/or financial indicators (e.g., PF and PS ratios) to a stock broker's company's computer system for any selected companies.

Transmission of Data on Behalf of a User to a User's Account with a Third Party

The computer system 8 may also include means to be instructed to periodically or upon request send patent data and/or patent based financial indicator information on selected companies in association with an identification of a user to another organization with which the user also has an account. For example, the user may have an account with a brokerage service that provides access to accounts over the Web. Patent based information on companies of stocks that the user is interested in could be transmitted to the user's brokerage service account and associated with the user's brokerage account. The user could access that information when accessing his brokerage account. Using that function, the service could integrate the patent based financial information into a web page showing other information on stocks in which the user was interested.

Responding to Requests by a Third Party on Behalf of a User's Account with the Third Party Moreover, the computer system 8 may also accept a request for patent based information on selected companies, from another organization (such as a user's brokerage company) with which the user has an account, upon receiving a request for the information and the user's ID (indicating the user's authorization for using this service) or the user's ID for the other organization's service (again indicating authorization for using this service). That would require that the user provide, to the computer system 8 their user ID for the other service, or to provide to the other service their ID for the computer system 8. In other words, there must be a means for the computer system 8 to recognize that a request is from one of its users prior to providing the service and debiting the user's account.

Providing Information to User's Accounts With Third Parties as a Condition in a Conditional Securities Order Moreover, the securities brokerage companies may combine patent based information to provide their users other types of conditional orders. For example, there currently exist stop limit orders and orders to buy at or below specified prices. Those orders are executed only when their condition is satisfied. However, those conditional orders could be further or alternately conditioned upon a specified patent based information, such as a CF exceeding a certain value, a patent portfolio valuation exceeding a certain value, or exceeding a sector average. Presently, most conditional orders are executed using computer implemented technology, and computer implemented technology could also execute orders conditioned upon patent based information.

Conditional Information Transmission

The computer system 8 may provide means for transmitting a message to the user, via a telephone, email, pager, etc., in response to the existence of a condition based upon patent data defined by the user. For example, upon the service determining that the patent portfolio valuation exceeded a certain fraction of the company's market capitalization, or upon the issuance of a patent in the name of the company, the system could send a message indicating the condition, to the user.

Demographics Based Transmissions

The computer system 8 may provide means for sending to the user messages (via email or HTML) based upon demographic information obtained from the user, such as age, income level, and/or the companies of which the user has obtained patent information from the service. For example, the system could transmit to the user information on companies in which there has recently been a large change in patent values, or companies which have the largest patent values, or on companies in a sector of the economy for which the user has relatively frequently obtained patent based information. The service could perform that action without any request by the user to do so, for example by presenting that information in HTML when the user contacted the Web site for the computer system 8 and identified themself by entering their user ID and password. Alternatively, the computer system 8 may query the user to see if the user wanted to receive this type of information. In addition, the service could send users that frequently used the service advertising solicitations from a financial service company having services oriented towards frequent trading, such as an on line brokerage company.

Affiliates Programs With Brokerage Companies

Further, the computer system 8 may obtain commission fees from brokerage firms, the fees based upon transactions made by the user in response to the user's receipt of a report or notification from the computer system 8. That is, the brokerage firms have an incentive for the user to make trades, and the reports and patent issuance notifications provided by the computer system 8 may motivate the user to trade frequently.

The computer system 8 could affiliate a brokerage company so that the computer system of the brokerage company credits a commission to the computer system 8 whenever a user of both computer systems received a report or notification on a stock company from computer system 8, and then clicked on a link on the computer system 8's web site identifying the brokerage company in order to ultimately connect to the brokerage company's computer system and trade the stock of the company for which the user received the notification or report. The link on the computer system 8 may be a logical address on the server of the computer system 8 which logs the user's linking, then redirects the user's browser to the brokerage company's URL, and then sends an electronic message to the brokerage company's web site indicating the name of the company identified in the report of notification and the identity of the user.

Alternatively, either the logical address in the link in the notification or report transmitted to the user's computer or the logical address in the link to which the computer system 8 redirects the user's browser may contain either or both of the user's identity and the identity of the company or stock for which the user received the notification or report. The computer system of the brokerage company may use that information in accounting whether the user makes a transaction on the company identified in the report and therefore whether and how much to credit the computer system 8 (or the owner's of the computer system 8). In fact, this method of containing both the user's identification, the identification of a specified product or service, and a seller of the specified product or service or a related product or service, in a logical address in a link in a web page provided by one web site and identifying the seller, as a basis for the seller of the product or a service or related product or service accounting for crediting the producer of the first web page containing the link, as a result of the user linking to the seller's web site and purchasing the product, service, or related product or service has general applicability in accounting for electronic transactions resulting from user's viewing web pages. The logical address linking to the seller's web site should also contain an indication of the identity of the producer of the first web page. The amount of credit provided by the seller to the producer of the first web page is predetermined based upon a contract between the owners for the two web sites.

If the notification is via an email, the link may be contained in the email so the user can conveniently click in the email to redirect his browser ultimately to his brokerage company's web site. Multiple brokerage company links may be provided to the user. However, if the user identifies their brokerage company to the computer system 8 so that the computer system 8's user database stores that information, the web pages sent to the user by the computer system 8 may be customized to include the links to the user's brokerage company's web site. The brokerage company's computer system would then credit the computer system 8 if the user conducted a transaction on the company during the user's session, or during a determined period of time after receiving the message from the computer system 8.

Stock Trading Supporting Brokerage Activities

The computer system 8 may be programmed to electronically buy and sell securities. The programmed decision making to buy and sell securities may be based upon patent and other financial information. The decision making for a selected security may also be based upon the predetermined number of user's receiving notifications or reports for the company that issued the security, the number of outstanding shares of the company, and predetermined statistics, based upon the computer system 8's log files indicating the number of shares of securities purchased by users in response to the issuance of a notification or report as a function of the number users receiving the notification or report. The computer system 8 may act as a brokerage account for the user, allowing the user to buy and sell securities, and may log the number of shares, price, and identity of the securities purchased by the users, and purchased by the user's in response to receiving a notification or report on the company issuing the security. Purchase in response to a notification report may be based upon purchase during the same use session, during a specified time period after receiving the report, or identified by the request to purchase containing data indicating that the request is based upon a notification or report.

Validating Accredited Investors

Validating that an investor is an "accredited investor" within the meaning of the securities laws of the United States is also a useful function. We have conceived of a computer network implemented method to perform validation of accredited investor status with minimal expenditure of time and effort. This service would be highly valuable because pre qualifying accredited investors allows them to be solicited and to explore non public securities offering without confirming their "accredited investor" status for each new security.

Accordingly, an object of this invention is to provide an easily and rapidly accessible verification of a person's "accredited investor" status.

Implementation of the Accredited Investor Network

The computer system 8 may also include software facilitating verifying an investor is an accredited investor. In this embodiment, a user contacts the computer system 8 which runs algorithms facilitating accrediting the investor, and requests verification that he or she is an accredited investor.

The computer system 8 prompts the user for information useful to establish accredited investor status, including annual gross income, preferably for the last two years, net worth, and also information useful to determine whether the investor meets certain objective criteria useful in determining if the investor has sufficient independent knowledge of investing and business knowledge to be deemed an accredited investor even assuming that he or she does not meet the income or net worth tests. The objective criteria may include whether the user runs a business, whether the user has invested in the stock market or other securities markets, the length of the investment period, whether the user has taken investment courses, whether the user has a license as an investment advisor, attorney, stock broker, or any other profession indicating knowledge of investing. The user transmits data in response to these queries.

Verification of User's Income or Net Worth Test Data by Objectively Trustworthy Third Party The user's net worth may verified by a brokerage company specified by the user and affiliated with the computer system 8. The computer system 8 may transmit the user's identification to the affiliate and a request for electronic confirmation that the value of the user's account was above a determined amount necessary for verifying that the investor was accredited. If the user's data meets the gross income or net worth test, the user may be queried to provide their employer, accountant, lawyer, or financial advisor's contact and identification information (name, email address, and employer tax identification number), and for an authorization to obtain verification from that user's employer, accountant, lawyer, or financial advisor that the user's gross income and/or net worth meet the relevant test for accredited advisor status. The computer system 8 sends a query preferably via email to the user's verifying entity so that that entity can electronically verify that the user meets the relevant test.

The query for confirmation of the user's financial data may be coupled to a verification of identity of the entity providing the confirmation for example via (1) a digital signature verifiable against a database of digital signatures of licensed accountants, advisors, or employers, or (2) a password and user ID identifying a data transmission as originating with a licensed accountant, investment advisor, or employer. The password and user ID or digital signature may be stored in a database accessible over a network, such as the Internet, wherein the database is one that is known to contain data (digital signature or password and identification) identifying accountants, investment advisors, or other licensed or registered investment advisors. The computer system 8 may store and control the contents of the database. Thus, the verification could encompass obtaining an independent verification of the financial status of the prospective accredited investor via network communications from an entity having personal knowledge of the user's financial status, and independent verification of the identify and financial competence of the verifying entity.

Verification of User's Capital

Additionally, the user could be queried for account information for financial institutions and authorization for those institutions to provide a value of net assets held by the institution in the name of the user. The financial institutions could be queried via a network for this information and also for a verification of their status as a financial institution, in a manner analogous to the one described for verifying the legitimacy of accountants and investment advisors. Alternatively, the electronic addresses of financial institutions provided by the user could be independently verified by using database resources of financial institutions electronic addresses that are now widely available and comparing those addresses with ones provided by a user. Addresses provided by the user that did not match any known financial institution could be considered unverified, and any data from those addresses could be excluded in determining if the user had enough net worth to qualify as an accredited investor.

Verification of User's Objective Criteria Data by Objectively Trustworthy Third Party The computer system 8 may provide means for a user to provide information by (e.g., by clicking check boxes) to indicate whether the investor meets certain objective criteria useful in determining if the investor has sufficient independent knowledge of investing to be deemed an accredited investor, assuming that the user does not meet the income or net worth tests. Such information includes years of stock market investment experience, stock portfolio held by ticker symbol, formal financial training or license such as a CPA or CFA, or other similar criteria. The computer system 8 may also prompt the user for authorization for institutions to verify the information provided by the user. The computer system 8 may electronically request verification of the information provided by the user by from a computer system of a brokerage company, educational institution, state or federal licensing agency.

Independent Database Verification of Institutional Addresses

Alternatively, the electronic addresses of any institutions provided by the user could be independently verified by using database resources identifying electronic addresses of institutions. Addresses provided by the user that did not match any known financial institution could be considered unverified, and that information could form part of the basis for determining if the user qualified as an accredited investor. This service would be highly valuable to entrepreneurs concerned with liability due to soliciting securities from no accredited investors.

INDUSTRIAL APPLICABILITY

The invention is applicable in the financial services industry.

The invention claimed is:

1. A computer implemented method comprising the steps of:
   determining, using a first computer system, a first CF of a first patent;
   wherein said determining comprises:
   configuring said first computer system to solve an equation for CF, said equation for CF defining CF as a function of variables including a MED and patent data, wherein said patent data includes a measure of length of a claim;
   storing, in a database associated with said first computer system, said MED and said patent data;
   accessing, using said first computer system, said database to retrieve first patent data for said first patent and said MED to a processor of said first computer system;
   solving said equation for CF for said first patent, using said first computer system and said first patent data for said first patent and said MED;
   and
   displaying, using a second computer system, an indication for said first patent based based at least upon the value of said first CF.

2. The method of claim 1 wherein said MED is GDP.

3. The method of claim 1 wherein said step of determining further comprises:
   solving for said value of said CF for said first patent in an equation equating said MED to a sum of values of said CF for substantially all patents for which data exists in said patent data.

4. The method of claim 1 wherein said step of determining comprises determining a relative value number for each one of substantially all patents for which data exists in said patent data.

5. The method of claim 4 wherein each said relative value number is a measure of at least one characteristic intrinsic to the corresponding patent.

6. The method of claim 5 wherein said at least one characteristic includes a length of an independent claim.

7. The method of claim 5 wherein said at least one characteristic includes a number of independent claims.

8. The method of claim 5 wherein said at least one characteristic includes a measure of a length of a section of said patent.

9. The method of claim 5 wherein said at least one characteristic includes a number of claims.

10. The method of claim 1 wherein said step of determining comprises solving for said value of said CF for said patent in an equation equating said MED to a constant times a sum of relative value numbers for substantially all patents.

11. The method of claim 1 further comprising the steps of:
    determining a valuation for said first patent based in part upon said value of said CF for said patent; and
    displaying an indication based upon said valuation for said first patent.

12. The method of claim 11 wherein said valuation is based upon income valuation theory.

13. The method of claim 12 wherein said valuation is based upon an internal rate of return.

14. The method of claim 11 further comprising the steps of:
    determining a valuation for a portfolio of patents including said first patent; and
    displaying an indication for said portfolio based upon said valuation.

15. The method of claim 1 wherein said equation defines said value of said CF of said first patent as a function of variables including a relative patent number for a different patent.

* * * * *